US007324933B2

(12) United States Patent
Shen et al.

(10) Patent No.: US 7,324,933 B2
(45) Date of Patent: Jan. 29, 2008

(54) METHOD AND DEVICE FOR SIMULATING AN IMPULSE-TYPE CRT DISPLAY

(75) Inventors: Yuh-Ren Shen, Tai-Nan (TW); Cheng-Jung Chen, Maio-Li County (TW)

(73) Assignee: VastView Technology Inc., Hsinchu (TW)

( * ) Notice: Subject to any disclaimer, the term of this patent is extended or adjusted under 35 U.S.C. 154(b) by 517 days.

(21) Appl. No.: 10/850,172

(22) Filed: May 19, 2004

(65) Prior Publication Data

US 2005/0261883 A1 Nov. 24, 2005

(51) Int. Cl.
*G06F 9/44* (2006.01)

(52) U.S. Cl. ........................................ 703/21; 345/102

(58) Field of Classification Search .................. 703/21; 345/87; 1/102
See application file for complete search history.

(56) References Cited

U.S. PATENT DOCUMENTS 7,218,307 B1 * 5/2007 Chao .......................... 345/102
7,224,342 B2 * 5/2007 Chen et al. ................. 345/102
2005/0200579 A1 * 9/2005 Chen et al. ................... 345/87
2006/0033698 A1 * 2/2006 Chen et al. ................. 345/102

OTHER PUBLICATIONS

Gatti et al., F. Low Power Control Te4chniques for TFT LCD Displays, Proceedings of the 2002 Int. Conf. on Compilers,Architecture, and Synthesis for Embedded Systems, Oct. 2002, pp. 218-224.*

* cited by examiner

*Primary Examiner*—Russell Frejd

(57) ABSTRACT

Method and device for simulating an impulse-type CRT display is provided, in which the device has first and second input control lines, first and second input data lines, first and second capacitors, a driving voltage output line, and a first transistor having a gate connected to the first input control line, a source connected to the first input data line, and a drain connected to the driving voltage output line, the first capacitor and the drain of a second transistor that is similarly connected to various elements as in the first transistor. The two capacitors are connected to ground respectively, and the driving voltage output line is to output the simulation driving voltage to the pixels of an LCD panel. The first and second input control lines are connected to a first and second gate driver, and the first and second data lines are connected to a data driver respectively.

24 Claims, 13 Drawing Sheets frame: N-1
N
N+1
N+2
from code 32 to 120
$V_{LC}$
Code 0 (V1')
Code 32(V2)
Code 0 (V1)
V3'
V1'
V3
V1
Vcom
time point:
A1
A2
A3
A4
A5
A6
n
G1
G1'
D1
Code 32
Code 32
Code 120
time

METHOD AND DEVICE FOR SIMULATING AN IMPULSE-TYPE CRT DISPLAY

BACKGROUND OF THE INVENTION

1. Field of the Invention

The present invention relates to a method and a device used for simulating an impulse-type CRT display, and more particularly, to a method and a device used for simulating an impulse-type CRT display using a liquid crystal display (LCD).

2. The Prior Arts

In recent years, the technology and device of a liquid crystal display (LCD) have been very popular and widely used for the consumer electronic products, especially for video products, for example, televisions, computers, displays, telephone handsets, personal data assistants (PDA), and the like. The varieties of the products are enormous, so as to stimulate the tremendous rapid progress of the technology of the liquid crystal display and its direction of development is in agreement with the requirement of the future trend of development of electronic products toward the features of light weight, thin thickness, short length, small size, low power consumption, and low heat dissipation, etc.

Presently, televisions and display devices made with the technology of the liquid crystal display have been produced in large quantities, to replace the televisions and display devices made with the conventional CRT. However, in the liquid crystal display technology of the present days, there still exist drawbacks and limitations, which must be overcome and improved.

With regard to the CRT display, it utilizes the "impulse type" display method. It produces light emissions by means of irradiating a single electron beam on the pixels coated with fluorescence materials. However, as shown in curve (a) in FIG. 1, the pixel only produces the emission of light in a brief instant of time in each frame period. Therefore, it almost seems to have no image overlapping phenomenon to be noticed for the images displayed between the frames.

However, for the LCD display, it utilizes the "hold type" display due to the intrinsic property of the LCD material. It produces the image display through the optical response (namely, the gray level response) by means of applying driving voltages on the LCD material. Nevertheless, due to the limitation of the intrinsic property of the liquid crystal material, the image it displays occupies the predominant portion of time of that frame as shown in curve (c) in FIG. 1. And for every time its image changes, its luminance (or brightness) also changes stepwise. Therefore, from the viewpoint of the spectators, he may feel the overlapping of the image of the new frame on that of the old frame, so as to cause the blurring of the image outlines and produce the phenomenon of the so-called "after-image".

When utilizing an LCD display as the displaying device of a personal computer, this after-image phenomenon is not evident and usually will not be noticed, since the images it displays are static images that are displayed most of the time. However, when utilizing this LCD displaying device for use as a television, the problem of slower LCD gray scale optical response will be more pronounced, since almost all the television programs utilize dynamic images. Therefore, the image displaying effectiveness of the conventional LCD television is evidently inferior to that of a CRT television.

In order to eliminate the above-mentioned after-image caused by slow optical response of the LCD display device, and the resulting image outline blurring phenomenon, currently most LCD television manufacturers try to convert the "hold type" display of the LCD displaying device into the simulated (or pseudo) impulse type LCD displaying device similar to that of the CRT displaying device, by means of a so-called "overdrive" technology, with its image only occupying a portion of the frame period according to the optical response as shown in curve (b) in FIG. 1, namely, the image is not displayed during a portion of each frame period.

The method utilized in this technology is a kind of "overdrive" method. It applies a voltage (for example code 200) which is much higher than the originally set target voltage (for example code 120) to the liquid crystal material, so as to expedite and accelerate the response speed of the liquid crystal molecules, and accelerating them to reach the predetermined optical response value, and as such shortening the liquid crystal gray level response time to less than one frame period, as shown in curve (b) in FIG. 1.

However, even the LCD display device made with this kind of overdrive technology is able to shorten its gray level response time to less than and within one frame period; yet due to the intrinsic property of the liquid crystal, the generation of the optical response is slow and so is its decline. Therefore, the image overlapping and the image outlines blurring phenomenon of the "after-image" for the images displayed still can not be eliminated completely.

In order to completely eliminate the "after-image", presently there are three methods adopted by the prior art, which are listed as follows:

(1) to write black data or black images into the frame in the remaining portion of that frame period after the original formal image is displayed;

(2) to shut off the backlight, for example, the blink light method as published by Hitachi;

(3) the combination of the above methods (1) and (2), namely, both write in black image and shut off the backlight.

And in the following we will explain their respective drawbacks and limitations in detail.

First, referring to FIGS. 2A-2C, which illustrate the methods adopted by the prior art in simulating the impulse-type CRT display using an LCD display device, the images displayed by the liquid crystal display of the prior art are composed of a series of frames 1, 2, 3, and 4. The method utilized is to insert the complete black frames 11, 12, and 13 between frames 1, 2; frames 2, 3; and frames 3, 4 so as to achieve the simulation of an impulse-type CRT display, and at the same time the backlight source at time points 14-20 corresponding to the time points of the above-mentioned frames are all in the illumination state.

Next, we are going to explain the second method of the prior art. Please refer to FIG. 2B. At this time, the images displayed by the LCD display consist of the sequentially displayed frames 1-7. The second method is performed by shutting off the backlight source at time points 22, 24, and 26 which are corresponding to the time points of frames 2, 4, and 6, and the backlight source at time points 21, 23, 25, and 27 which are corresponding to time points of frames 1, 3, 5, 7, and 9 which are in the illumination state, and in this manner, achieving the simulation of the impulse-type CRT display using an LCD display and eliminating the "after-image".

And then next, we are going to explain the third method of the prior art. Please refer to FIG. 2C, which indicates that the images displayed by the LCD display are composed of a series of sequentially displayed frames 1-4. The method is carried out by inserting the complete black frames 11, 12, and 13 between frames 1, 2; frames 2, 3; and frames 3, 4 respectively, and by putting the backlight source at time points 22, 24, and 26 corresponding to those of frames 11, 12, and 13 into the shut-off state, and by putting the backlight source at other time points corresponding to those of frames 1, 2, 3, and 4 into the illumination state. And that is to say, the third method achieves the effect of simulating an impulse-type CRT display using an LCD display by inserting the complete black frames between frames 1, 2, 3, and 4, and at the same time utilizing this blink light mode of alternating illumination state and shut off state by means of shutting off the backlight source at the corresponding time points.

However, the three above-mentioned methods have their respective drawbacks and limitations.

First, the first method of inserting complete black frames between frames necessitates the addition of extra equipments, for example, a frequency doubling device. Supposing that the original image displaying speed is 60 frames/min, the application of this method then necessitates the addition of the frequency doubling device to increase the image displaying speed to 120 frames/min, and wherein half of the number are used for inserting those black frames. Therefore, the utilization of this method would increase the cost of the equipment. Besides, the doubling of the image display frequency leads to the increase of electric-magnetic interference (EMI), and these are the drawbacks and limitations of the first method of the prior art.

Next, the application of the second method also necessitates the addition of a frequency doubling device, so as to achieve the equivalent number of display frames/unit time. Since half of the frames displayed in the unit time correspond to the backlight shut-off state, and cannot be displayed as visible images, the second method will increase the cost of the equipment, and it will also cause the increase of EMI. In addition, it requires the addition of extra equipment so as to make the backlight source blink, and therefore, it further increases the cost of this method. And these are the drawbacks and limitations of the second method of the prior art.

And next, the third method of the prior art is a combination of the above two methods, namely, inserting the black frames and blinking the backlight modules. As such, the drawbacks and limitations of the third method include those of the above two methods. Therefore, it is not satisfactory either.

In addition, in the above first and second methods, since the characteristics and speeds of optical response of different liquid crystal materials are different, the method of inserting black frames is not suitable for certain liquid crystal materials. Because for certain liquid crystal materials, their optical responses are fast from brightness to dark, and are slow from dark to brightness; but for other liquid crystal materials, their optical responses are slow from brightness to dark, and are fast from dark to brightness. Therefore, the effectiveness of inserting black frames at equal time intervals in simulating the impulse-type CRT display is not ideal and thus not satisfying, and in certain circumstances it is even not suitable for application. And it cannot achieve the simulation of the CRT display using an LCD display, and it is not able to achieve the effectiveness of eliminating the "after image" either.

In view of the various above mentioned drawbacks and limitations of the prior art, the inventor of the present case dedicates all his talent, ingenuity, knowledge and experience in this field to the related research, development, experiment, and improvement, so as to bring about the realization of the present invention.

SUMMARY OF THE INVENTION

Therefore, the purpose of the present invention is to provide a device used for simulating an impulse-type CRT display so as to overcome and improve the drawbacks and limitations of the related prior art. It neither utilizes the method of inserting black frames, nor does it utilize the method and design of blinking the backlights. Instead, it makes use of the method of providing the scanning black lines on the screen of the LCD display, to ensure the simulation of the impulse-type CRT display, and to effectively eliminate the "after-image" and the phenomenon of image outline blurring, so as to significantly improve the quality of the displayed images of the LCD display, and save the costs on additional equipment.

In order to achieve the above mentioned purpose, the present invention provides a device to simulate the CRT display using an LCD display, and its basic structure comprising:

A first input control line; a second input control line; a first input data line; a second input data line; a first capacitor; a second capacitor; a driving voltage output line; a first transistor, comprising a first gate connected to a first input control line, a first source connected to a first input data line, and a first drain connected to a driving voltage output line, a first capacitor, and the drain of a second transistor; and the second transistor, comprising a second gate connected to a second input control line, a second source connected to a second input data line, and a second drain connected to a driving voltage output line, the drain of the first transistor, and the second capacitor; wherein the first capacitor and the second capacitor are connected to ground, respectively, and the driving voltage output line is used to output the driving voltage to the pixels of the LCD panel for displaying images; and it is characterized in that, the first and second input control lines are connected to a first and second gate driver, respectively, and the first and second data lines are connected to a data driver respectively.

In the following we will explain in detail the embodiments and other variations of the device of the present invention used for simulating the impulse-type CRT display.

The present invention also provides a method used for simulating the impulse-type CRT display.

The various features and advantages of the present invention can be more thoroughly understood through the detailed description of the following embodiments with reference to the attached drawings, wherein similar reference numbers are used for similar elements.

BRIEF DESCRIPTION OF THE DRAWINGS

The related drawings in connection with the detailed description of the present invention to be made later are described briefly as follows, in which:

FIG. 3(*b*) indicates the simulation device according to the first embodiment of the present invention;

FIG. 5(*b*) indicates the simulation device according to the second embodiment of the present invention;

FIG. 7(*b*) indicates the simulation device according to the third embodiment of the present invention;

FIG. 9(*b*) indicates the simulation device according to the fourth embodiment of the present invention;

FIG. 11(*b*) indicates the simulation device according to the fifth and the sixth embodiments of the present invention;

DETAILED DESCRIPTION OF THE PREFERRED EMBODIMENT

Figure 1:
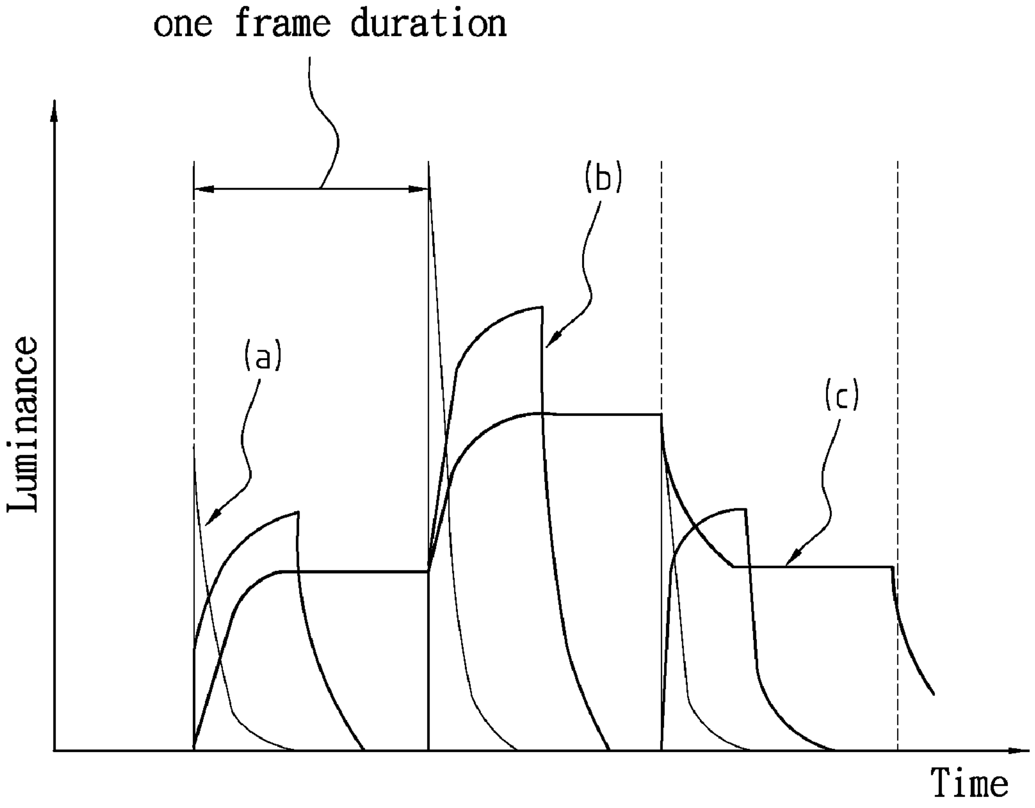
FIG. 1 ( Prior Art )
FIG. 1 is the diagram of comparison of optical response curves of the CRT image display, the liquid crystal image display, and the impulse-type CRT display.
Figure 2C:
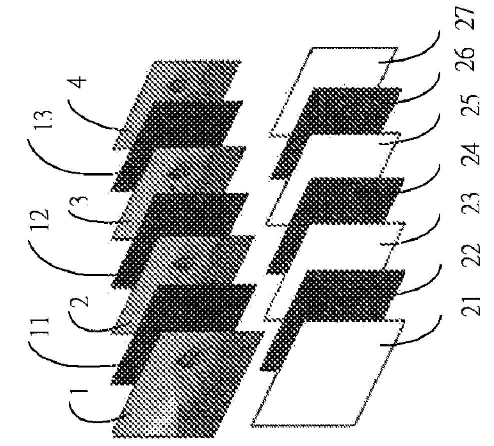
FIG.2C (Prior Art)
FIGS. 2(*a*) to 2(*c*) indicate the methods of inserting black frames, black light blinking, and the combination of the two used by the prior art in simulating the CRT display using an LCD display.
Figure 2B:
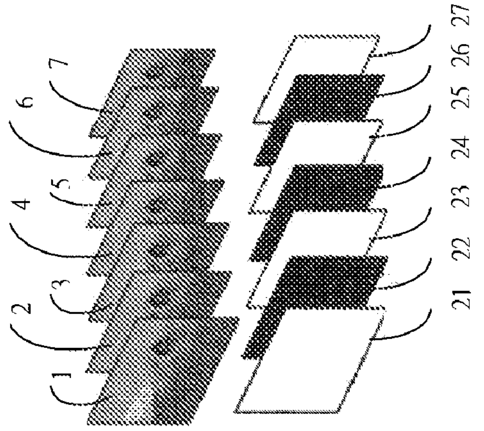
FIG.2B (Prior Art)
Figure 2A:
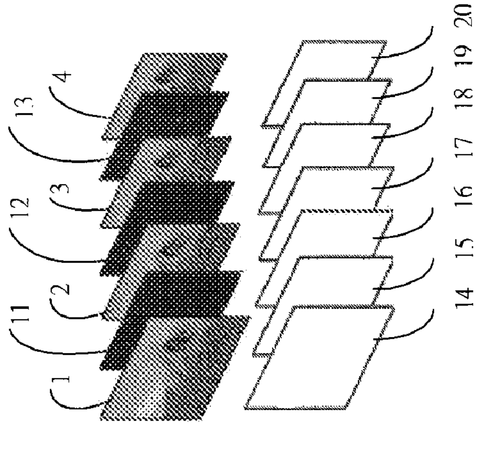
FIG.2A (Prior Art)

In the following, the embodiments of the present invention will be described with reference to the attached drawings. And similar reference numbers represent similar elements.

In the following embodiments, the waveforms displayed are mainly used as instruments or tools to describe the voltage applied on the liquid crystal, and the characteristics and behaviors of the liquid crystal optical response. And the features and advantages of the present invention will be explained based on the above descriptions.

In FIGS. 4, 6, 8, 10, and 12 in the following five embodiments, the abscissa indicates time, and its units are in millisecond (ms), with A1 to A6 as the sequentially progressing time points; and its ordinate indicates driving voltage, with "code" as its displaying unit. For the sake of convenience, in the above-mentioned drawings, the time of the waveform progression on the abscissa can be divided into an (N−1)th, Nth, (N+1)th, (N+2)th, and so on, equal frame time partitions as the units of frame time. And the dotted lines in FIGS. 4(*a*), 6(*a*), 8(*a*), 10(*a*), and 12(*a*) indicate the optical response (namely, the gray level response) path characteristic curves for the liquid crystal molecules under the application of various different driving voltages. Usually, the optical response is the luminance displayed by the liquid crystal, and with nits ($cd/m^2$) as its unit.

In the following descriptions, the meanings of the symbols represented by the pulse of voltage in FIGS. 4(*a*) to 4(*e*), 6(*a*) to 6(*g*), 8(*a*) to 8(*d*), 10(*a*) to 10(*d*), and 12(*a*) to 12(*e*) can be better understood by referencing the circuit structure of FIGS. 3(*b*), 5(*b*), 7(*b*), 9(*b*), and 11(*b*). For example, the waveform shown in FIG. 4(*b*) represents the pulse of the control voltage applied on the gate of transistor Q of the simulation device in FIG. 3(*b*); the waveform shown in FIG. 4(*c*) represents the pulse of the control voltage applied on the gate of transistor Q' of the simulation device in FIG. 3(*b*); the waveform shown in FIG. 4(*d*) represents the pulse of the driving voltage applied on the source of transistor Q of the simulation device in FIG. 3(*b*); the waveform shown in FIG. 4(*e*) represents the pulse of the driving voltage applied on the source of transistor Q' of the simulation device in FIG. 3(*b*); $V_{LC}$ represents a pulse of the output driving voltage generated by the simulation device, and $V_{COM}$ represents a reference voltage. The abscissa representing time is arranged below FIG. 4(*e*) for jointly used by FIGS. 4(*a*) to 4(*e*), and for being conveniently referenced and compared between FIGS. 4(*a*) to 4(*e*); and A1 to A6 represent the sequentially progressing points of time. And the similar details of the remaining FIGS. 6, 8, 10, and 12 can be explained similarly as above.

The CRT simulation method and device of the present invention will be explained in the following with the circuit diagram, the control voltage pulse waveform of the LCD display pixel unit, waveform of the driving voltage pulse, and the liquid crystal optical response characteristic curve of the respective five embodiments.

Embodiment 1

In the following analysis, please refer to FIGS. 3(*a*), 3(*b*) and FIGS. 4(*a*) to 4(*e*) as we explain the first embodiment of the present invention.

Figure 3A:
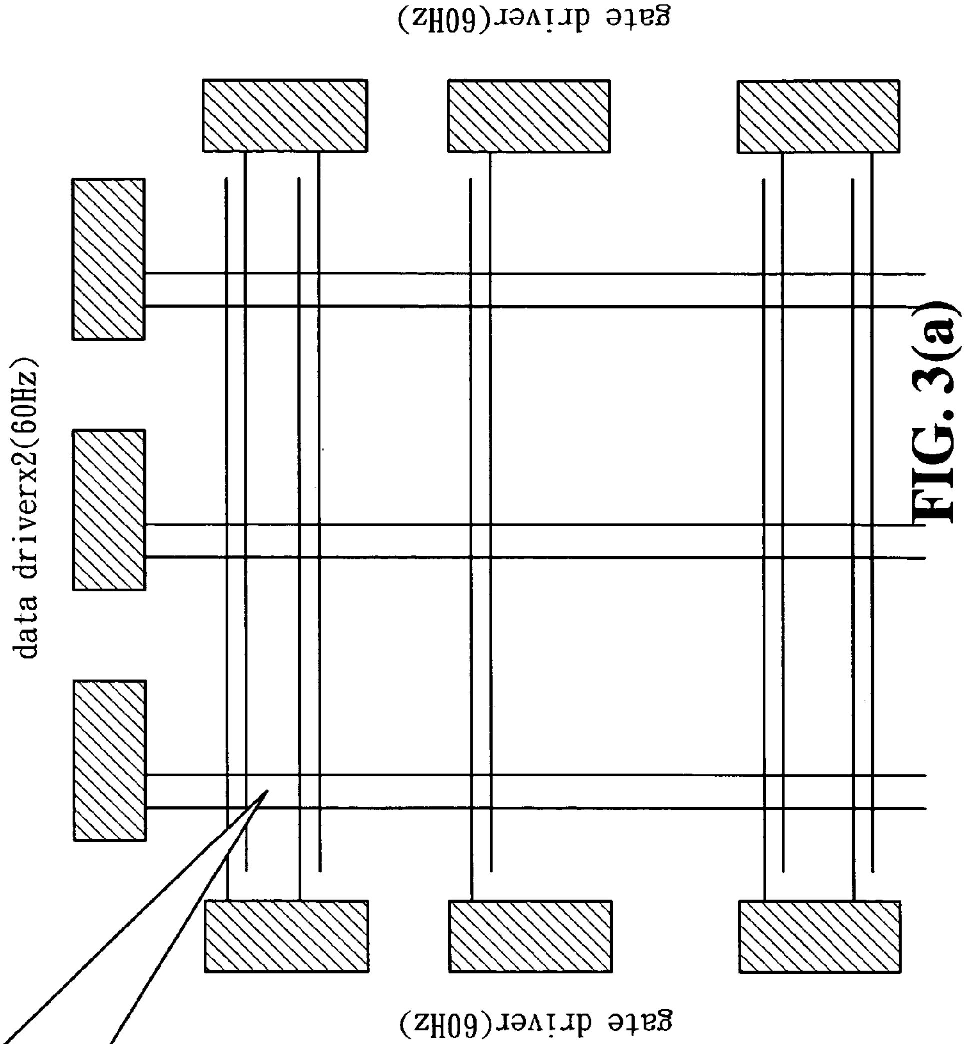
FIG. 3(*a*) is the schematic diagram indicating the pixel array formed by the cross points of a plurality of gate lines and data lines, and the driving circuit formed by a plurality of data driver and gate driver according to the first embodiment of the present invention.
Figure 3B:
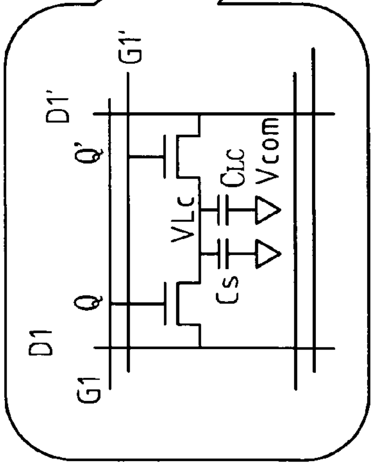

First, please refer to FIG. 3(*a*), which indicates: the pixel array formed by the cross points of a plurality of gate lines and data lines, and the driving circuit formed by a plurality of data drivers and gate drivers, according to the first embodiment of the present invention. And FIG. 3(*b*) represents the simulation device according to the first embodiment.

Simulation Device

According to FIGS. 3(*a*) and 3(*b*), the simulation device comprises: a first input control line ($G_1$); a second input control line ($G_{1'}$); a first input data line ($D_1$); a second input data line ($D_{1'}$); a first capacitor ($C_S$); a second capacitor ($C_{LS}$); a driving voltage output line; a first transistor (Q) comprising a first gate connected to the first input control line ($G_1$), a first source connected to the first input data line ($D_1$), and a first drain connected to the driving voltage output line, the first capacitor ($C_S$), and the drain of the second transistor (Q'); and a second transistor (Q') comprising a second gate connected to the second input control line ($G_{1'}$), a second source connected to the second input data line ($D_{1'}$), a second drain connected to the drain of the first transistor, the second capacitor ($C_{LC}$), and the driving voltage output line, wherein the first capacitor and the second capacitor are a storage capacitor and a liquid crystal equivalent capacitor, respectively; the storage capacitor has a first end connected to the driving voltage output line and a second end connected to ground; the liquid crystal equivalent capacitor has a first end connected to the driving voltage output line and a second end connected to ground; and the driving voltage output line is used to output the driving voltage used for simulation to the pixels of the LCD panel for displaying images; and it is characterized in that the first and second input control lines are connected to a first and a second gate driver, respectively, and the first and second input data lines are both connected to a data driver.

Simulation Method

The following is a simulation method used for a simulation device, according to the first embodiment of the present invention, comprising the following steps: (I) providing a circuit having a first input control line, a second input control line, a first input data line, a second input data line, a first transistor, a second transistor, a first capacitor, a second capacitor, and a driving voltage output line; (II) providing a first control signal ($G_1$) with periodic pulse waveforms to the first input control line which is connected to a gate of the first transistor (Q) of the circuit; (III) providing a second control signal ($G_{1'}$) with periodic pulse waveforms to a gate of the second transistor (Q') of the circuit, wherein the second control signal ($G_{1'}$) is the same as the first control signal ($G_1$) except for having a phase delay; (IV) providing a first data signal ($D_1$) to the first input data line which is connected to a source of the first transistor (Q) of the circuit; when activated by the first control signal ($G_1$), the first data signal ($D_1$) is fed to the driving voltage output line via the circuit when the first transistor is activated by the first control signal; (V) providing a second data signal ($D_{1'}$) to the second input data line which is connected to a source of the second transistor (Q') of the circuit; when activated by the second control signal ($G_{1'}$), the second data signal ($D_{1'}$) is fed to the driving voltage output line via the circuit; and (VI) outputting an output driving voltages generated at the driving voltage output line by the above steps to a plurality of pixels for displaying images.

Waveform Analysis

In the following analysis, please refer to FIGS. 4(*a*) to 4(*e*) as we describe in detail the relations between the waveforms of the pulses of control voltages $G_1$, $G_{1'}$ and the driving voltage pulses $D_1$, $D_{1'}$, $V_{LC}$ applied to the first input data line, the second input data line, the first input control line and the second input control line, respectively, and are generated by the simulation device of FIGS. 3(*a*) and 3(*b*) according to the first embodiment of the present invention.

Figures 4A, 4B, 4C, 4D, 4E:
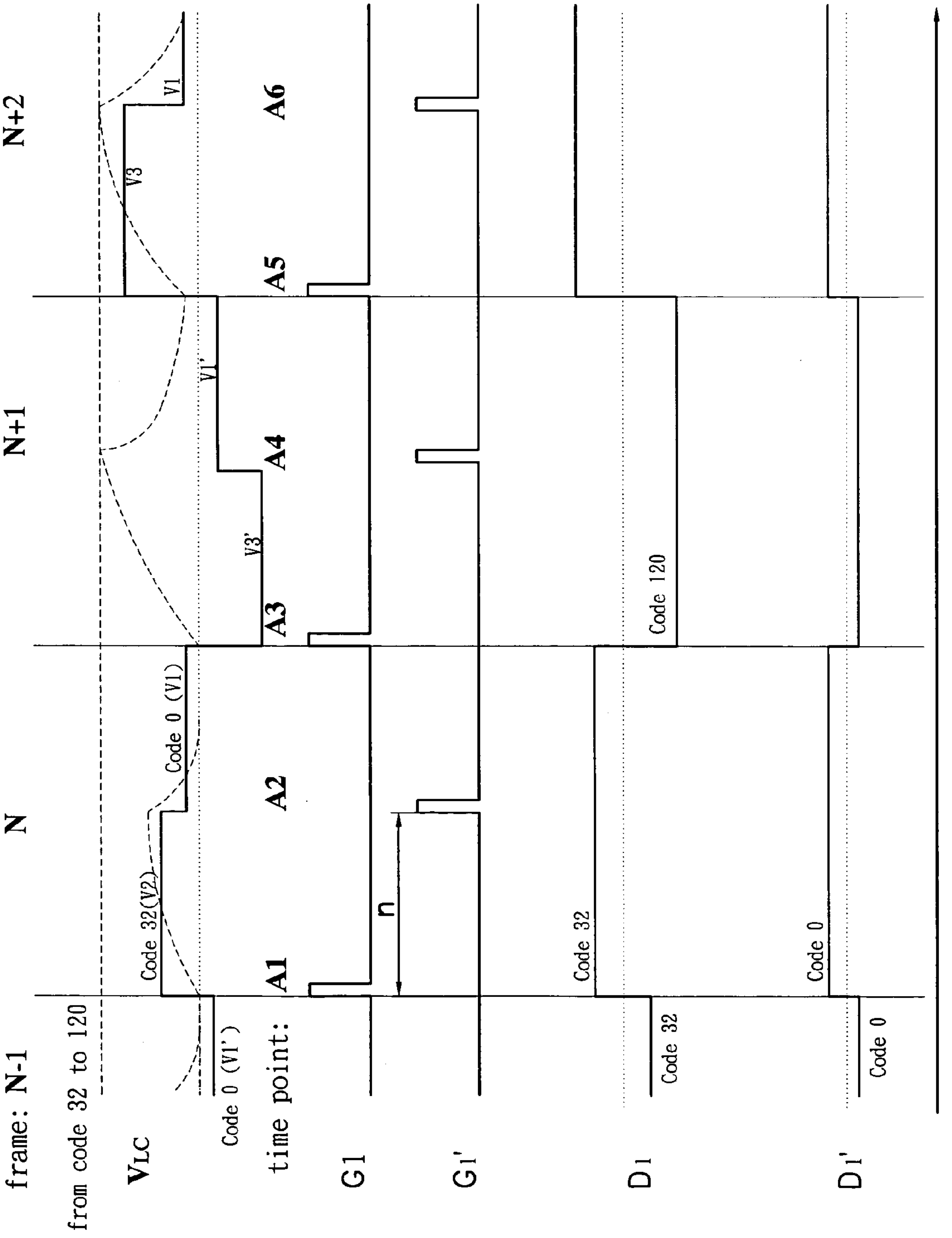
FIGS. 4(*a*) to 4(*e*) are the corresponding waveform diagrams of the control voltage pulse, driving voltage pulse, and the liquid crystal optical response curve generated by the simulation device according to the first embodiment of the present invention.

When the pulse of the control voltage of the simulation device is $G_1$ (FIG. 4(*b*)), the pulse of its corresponding driving voltage is then $D_1$ (FIG. 4(*d*)). When the pulse of the control voltage of the device is $G_1$ (FIG. 4(*c*)), the pulse of its corresponding driving voltage is then $D_{1'}$ (FIG. 4(*e*)). And the pulse of the actual combined output driving voltage generated by the simulation device of the present invention to the liquid crystal is $V_{LC}$ (FIG. 4(*a*)).

In the following discussion, the driving voltages $V_1$, $V_2$, $V_3$ can be considered as voltage values expressed in "code".

It must be re-emphasized here that the driving voltage can reach its target voltage momentarily, however, the liquid crystal molecules have to take a specified period of response time to reach its optical response target position after being applied the driving voltages. This is due to the intrinsic property of the liquid crystal.

Since usually AC voltage is utilized as the voltage for driving the liquid crystal, therefore, this driving voltage is in the form of alternating positive and negative phases during the control and driving processes of the liquid crystal (namely, the waveforms of the pulses of driving voltages $D_1$, $D_{1'}$, and $V_{LC}$ are in the form of alternating positive and negative phases relative to the reference voltage $V_{COM}$).

$V_{LC}$ is the output driving voltage generated at the driving voltage output line sequentially and periodically from time points A1 to A6 for (N−1)th, Nth, (N+1)th, and (N+2)th time frames in the following manner:

The value of driving voltage pulse $D_{1'}$ in the (N−1)th frame before time point A1 is $V_{1'}$ (code 0), and the value of the driving voltage pulse $V_{LC}$ is $V_{1'}$ (code 0), which is of negative polarity; at time point A1, the waveform enters the Nth frame; at this time, the value of the driving voltage pulse $D_1$ increases to $V_2$ (code 32) which is of positive polarity, and due to the activation of the control voltage pulse $G_1$, the value of driving voltage pulse $V_{LC}$ generated by the simulation device thereby also increases to $V_2$ (code 32) which is of positive polarity, and remains so until time point A2; then the time proceeds to time point A2, at this time, the value of driving voltage pulse $D_{1'}$ is $V_1$ (code 0) which is of positive polarity, and due to the activation of control voltage pulse $G_{1'}$, the value of driving voltage pulse $V_{LC}$, as a result, is to drop momentarily from $V_2$ (code 32) to $V_1$ (code 0), and is still to be of positive polarity; and this value is maintained until time point A3; then the time proceeds to time point A3 and enters the (N+1)th frame; at this time, the value of the driving voltage pulse $D_1$ drops to $V_{3'}$ (code 120), and is of negative polarity; and due to the activation of the control voltage pulse $G_1$, the value of the driving voltage pulse $V_{LC}$ also momentarily drops from $V_1$ to $V_{3'}$ (code 120), which is of negative polarity, and it remains so until time point A4; then time proceeds to A4; at this time, the value of driving voltage pulse $D_{1'}$ is still $V_{1'}$ (code 0), and due to the activation of control voltage pulse $G_{1'}$, the value of the driving voltage pulse $V_{LC}$, as a result, also increases from $V_3$ to $V_{1'}$ (code 0), and is still of negative polarity; and it remains so until time point A5; then time proceeds to time point A5 and starts to enter the (N+2)th frame; at this time, the value of the driving voltage pulse $D_1$ increases to $V_3$ (code 120) which is of positive polarity, and due to the activation of the control voltage pulse $G_1$, the value of the driving voltage pulse $V_{LC}$, as a result, also increases momentarily from $V_1$ to $V_3$ (code 120), which is of positive polarity, and it remains so until time point A6.

The variations of control voltage pulses $G_1$, $G_{1'}$ and driving voltage pulses $D_1$, $D_{1'}$, and $V_{LC}$ at the various time points after time points A6 can easily be inferred based on the above descriptions.

The dotted line as shown in FIG. 4(*a*) is the liquid crystal optical response characteristic curve produced while performing the simulation drive. When the output driving voltage of the simulation device between each time point is code 0 as shown in the figure, wherein when the output driving voltage $V_{LC}$ between each time point is $V_1$ or $V_{1'}$, a black line scanning is performed on the display screen during this period; and by doing so, it can achieve the same results as inserting black frames or shutting off the backlights, so as to simulate the impulse-type CRT display.

In addition, the n shown at pulse $G_{1'}$ in the Nth frame as shown in FIG. 4(*c*) indicates n pulses, which means that there exists the time difference of n scanning lines between the control voltage pulses $G_1$ and $G_{1'}$ in the same frame, namely, from the standpoint of the pixel, another control driving pulse $G_1$ will be inputted at only n $G_1$ pulses after the first $G_1$ pulse. And this interval of time represented by n can be properly adjusted by the designer, depending on the actual requirements such as the property of liquid crystal material etc., so as to ensure the effective simulation of the impulse-type CRT display. And this is the most important advantage of the present invention over prior art.

Embodiment 2

In the following analyses, please refer to FIGS. 5(*a*), 5(*b*) and FIGS. 6(*a*) to 6(*g*) as we explain the second embodiment of the present invention.

Figures 5A, 5B:
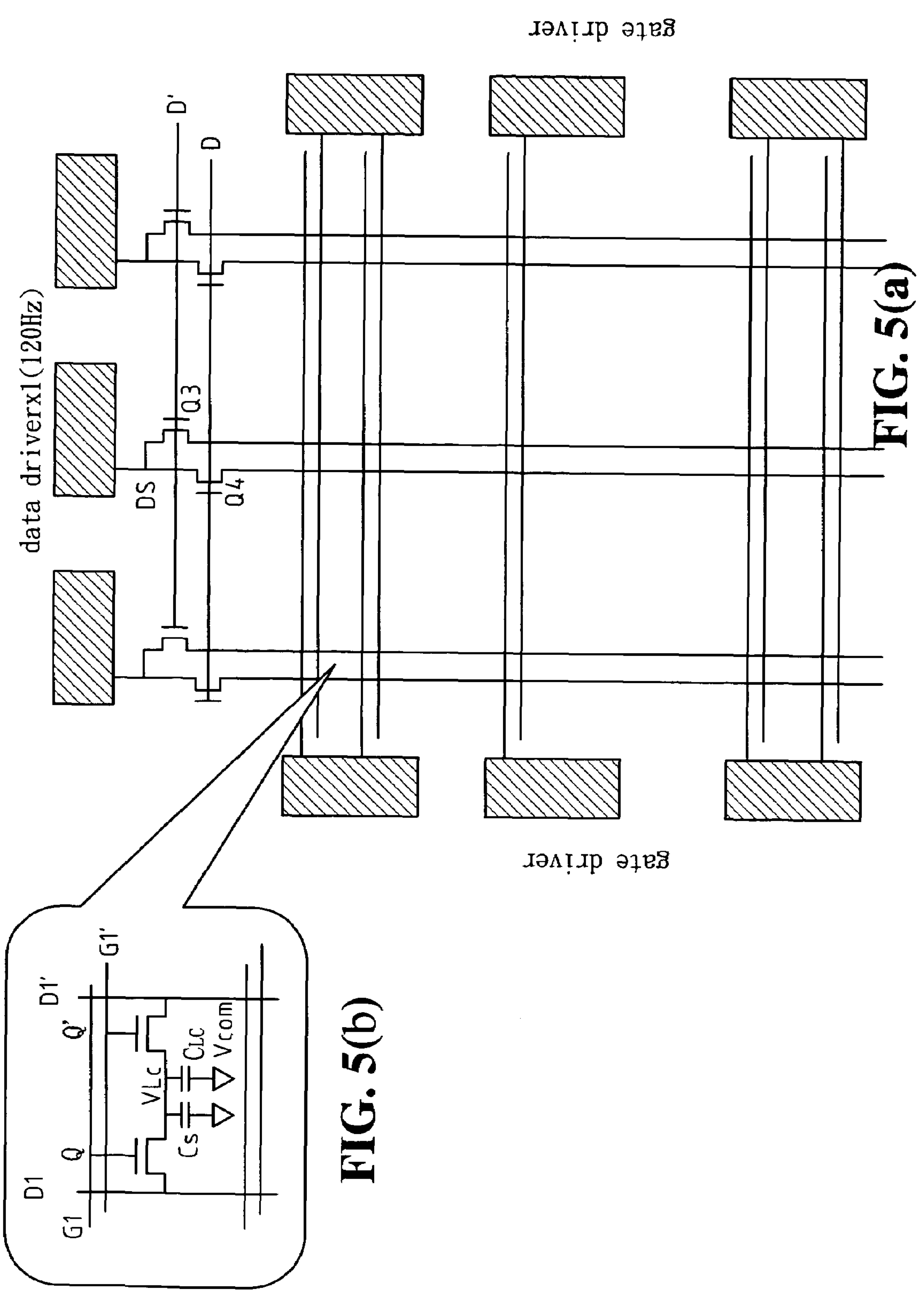
FIG. 5(*a*) is the schematic diagram indicating the pixel array formed by the cross points of a plurality of gate lines and data lines, and the driving circuit formed by a plurality of data driver and gate driver according to the second embodiment of the present invention.

First, please refer to FIG. 5(*a*), which indicates: the pixel array formed by the cross points of a plurality of gate lines and data lines, and the driving circuit formed by a plurality of data drivers and gate drivers, according to the second embodiment of the present invention. And FIG. 5(*b*) represents the simulation device according to the second embodiment.

Simulation Device

According to FIGS. 5(*a*) and 5(*b*), the simulation device of the second embodiment comprises: a first input control line ($G_1$); a second input control line ($G_{1'}$); a first input data line ($D_1$); a second input data line ($D_{1'}$); a third input data line (D'); a fourth input data line (D); a fifth input data line (Ds); a first capacitor ($C_S$); a second capacitor ($C_{LS}$); a third transistor (Q3); a fourth transistor (Q4); a driving voltage output line; a first transistor (Q) comprising a first gate connected to the first input control line ($G_1$), a first source connected to the input data line ($D_1$), and a first drain connected to the driving voltage output line, the first capacitor ($C_S$), and the drain of the second transistor (Q'); and a second transistor (Q') comprising a second gate connected to the second input control line ($G_{1'}$), a second source connected to the second input data line ($D_{1'}$), a second drain connected to the drain of the first transistor, the second capacitor ($C_{LC}$), and the driving voltage output line, wherein the first capacitor and the second capacitor are a storage capacitor and a liquid crystal equivalent capacitor, respectively, and are connected to ground; the storage capacitor has a first end connected to the driving voltage output line and a second end connected to ground; the liquid crystal equivalent capacitor has a first end connected to the driving voltage output line and a second end connected to ground; and the driving voltage output line is used to output the driving voltage to the pixels of the LCD panel for displaying the images; and it is characterized in that the first and second input control lines are connected to a first and second gate driver, respectively, and the first and second input data lines are connected to the drains of another two transistors (Q3, Q4), which are connected in parallel; the third transistor has a gate connected to the third input data line, a drain connected to the first input data line, and a source connected to the fifth input data line; the fourth transistor has a gate connected to the fourth input data line, a drain connected to the second input data line, and a source connected to the fifth input data line; the sources of the two switching transistors connected in parallel are connected to a data driver, with its gate connected to the third and fourth input data lines (D', D); and the time difference between the periodic pulse waveforms of the first and second input control signals (G1, G1') is the time difference across n scanning lines generated by n pulses, and which is adjustable.

Simulation Method

The following is the simulation method used for the simulation device, according to the second embodiment of the present invention, comprising the following steps: (I) providing a circuit having a first input control line, a second input control line, a first input data line, a second input data line, a third input data line, a fourth input data line, a fifth input data line, a first transistor, a second transistor, a third transistor, a fourth transistor, a first capacitor, a second capacitor, and a driving voltage output line; (II) providing a first control signal ($G_1$) with a periodic pulse waveform to the first input control line which is connected to a gate of the first transistor (Q) of the circuit; (III) providing a second control signal ($G_{1'}$) with a periodic pulse waveforms to the second input control line which is connected to a gate of the second transistor (Q') of the circuit, wherein the second control signal ($G_{1'}$) is the same as the first control signal ($G_1$) except for having the phase delay; (IV) providing a fifth data signal (Ds) to the fifth input data line which is connected to the sources of the third transistor (Q3) and the fourth transistor (Q4) which are connected in parallel; (V) providing a third data signal (D') to the third input data line which is connected to a gate of the third transistor (Q3); (VI) providing the voltage pulse generated by the drain of the third transistor to the source of the first transistor (Q1) as the first data signal (D1); when the first transistor (Q1) is activated by the first control signal (G1), the first data signal (D1) is fed to the driving voltage output line via the circuit; (VII) providing a fourth data signal (D) to the fourth input data line which is connected to a gate of the fourth transistor (Q4); (VIII) providing the voltage pulse generated by the drain of the fourth transistor to the second input data line which is connected to the source of the second transistor (Q') as the second data signal (D1'), when the second transistor (Q') is activated by the second control signal (G1'), the second data signal (D1') is fed to the driving voltage output line via the circuit; and (IX) outputting an output driving voltage at the driving voltage output line generated by the above steps to the pixels for displaying images.

Waveform Analysis

In the following analysis please refer to FIGS. 6(*a*) to 6(*g*), we describe in detail the relations between the waveforms of the pulses of control voltages $G_1$, $G_{1'}$ and the driving voltages pulses $D_1$, $D_{1'}$, $V_{LC}$ are applied to the first input data line, the second input data line, the first input control line and the second input control line, respectively, and are generated by the simulation device of FIGS. 5(*a*) and 5(*b*) according to the second embodiment of the present invention.

Since usually AC voltage is utilized as the voltage for driving the liquid crystal, therefore, this voltage is in the form of alternating positive and negative phases during the control and driving processes of the liquid crystal (namely, the waveforms of the pulses of driving voltages $D_1$, $D_{1'}$, and $V_{LC}$ are in the form of alternating positive and negative phases relative to the reference voltage $V_{COM}$).

$V_{LC}$ is the output driving voltage generated at the driving voltage output line sequentially and periodically from time points A1 to A6 for (N−1)th, Nth, (N+1)th, and (N+2)th time frames in the following manner:

The value of driving voltage pulse $D_{1'}$ in the (N−1)th frame before time point A1 is $V_{1'}$ (code 0), and the value of the driving voltage pulse $V_{LC}$ is $V_{1'}$ (code 0), which is of negative polarity; at time point A1, the waveform enters the Nth frame; at this time, the value of the driving voltage pulse $D_1$ increases to $V_2$ (code 32) which is of positive polarity, and due to the activation of the control voltage pulse $G_1$, the value of driving voltage pulse $V_{LC}$ thereby generated by the simulation device also increases from $V_1$ to $V_2$ (code 32), which is of positive polarity, and remains so until time point A2; then the time proceeds to time point A2, at this time, the value of driving voltage pulse $D_{1'}$ is $V_1$ (code 0) which is of positive polarity, and due to the activation of control voltage pulse $G_{1'}$, the value of driving voltage pulse $V_{LC}$, as a result, is to drop momentarily from $V_2$ (code 32) to $V_1$ (code 0), and is still of positive polarity, and this value is maintained until time point A3; then the time proceeds to time point A3 and enters the (N+1)th frame, at this time, the value of the driving voltage pulse $D_1$ drops to $V_{3'}$ (code 120), and is of negative polarity; and due to the activation of control voltage pulse $G_1$, the value of the driving voltage pulse $V_{LC}$ also momentarily drops from $V_1$ to $V_{3'}$ (code 120), which is of negative polarity, and it remains so until time point A4; then time proceeds to A4, at this time, the value of driving voltage pulse $D_{1'}$ is still $V_{1'}$ (code 0); and due to the activation of control voltage pulse $G_{1'}$, the value of the driving voltage pulse $V_{LC}$, as a result, also increases from $V_{3'}$ to $V_{1'}$ (code 0), and is still of negative polarity, and it remains so until time point A5; then time proceeds to time point A5 and starts to enter the (N+2)th frame, at this time, the value of the driving voltage pulse $D_1$ increases to $V_3$ (code 120) which is of positive polarity, and due to the activation of the control voltage pulse $G_1$, the value of the driving voltage pulse $V_{LC}$, as a result, also increases momentarily to $V_3$ (code 120), which is of positive polarity, and it remains so until time point A6.

The variations of the control voltage pulses $G_1$, $G_{1'}$ and the driving voltage pulses $D_1$, $D_{1'}$, and the $V_{LC}$ at the various time points after time points A6 can easily be inferred based on the above descriptions.

Figures 6A, 6B, 6C, 6D, 6E, 6F, 6G:
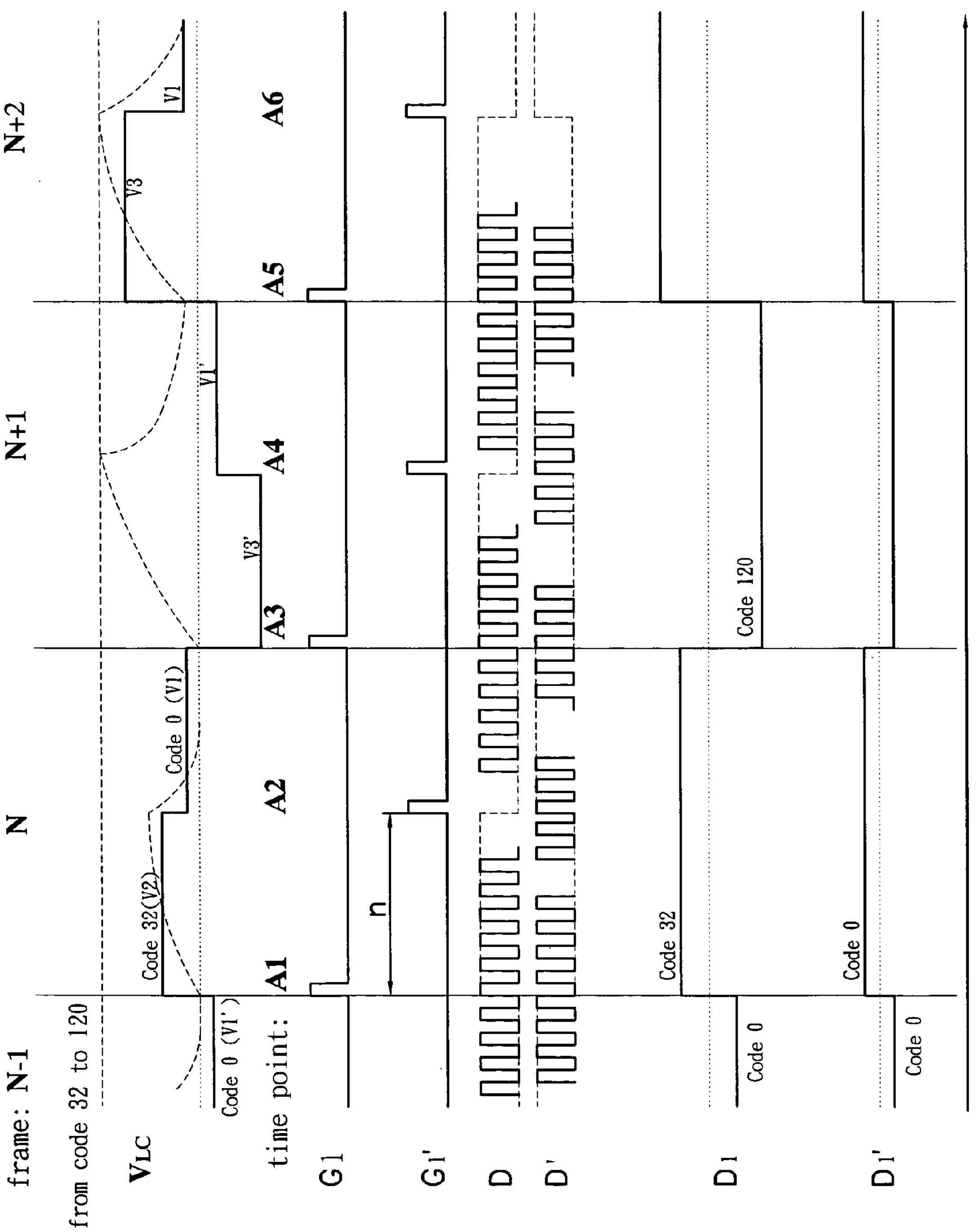
FIGS. 6(*a*) to 6(*g*) are the corresponding waveform diagrams of the control voltage pulse, the driving voltage pulse, and the liquid crystal optical response curve generated by the simulation device according to the second embodiment of the present invention.

FIGS. 6(*d*) and 6(*e*) indicate the waveforms of the voltage pulses of the third and fourth data signals of FIG. 5(*a*).

The dotted line as shown in FIG. 6(*a*) is the liquid crystal optical response characteristic curve produced while performing the simulation drive. When the output driving voltage of the simulation device between each time point is code 0 as shown in the figure wherein when the output driving voltage $V_{LC}$ between each time point is $V_1$ or $V_{1'}$, a black line scanning is whereby performed on the display screen during this period, and by doing so, it can achieve the same results as inserting black frames or shutting off the backlights, so as to simulate the impulse-type CRT display.

In addition, the n shown at pulse $G_{1'}$ in the Nth frame as shown in FIG. 6(*c*) indicates n pulses, which means that there exists the time difference of n scanning lines between the control voltage pulse $G_1$ and $G_{1'}$ in the same frame, namely, from the standpoint of the pixel, another control driving pulse $G_1$ will be inputted, at only n $G_1$ pulses after the first $G_1$ pulse. And this interval of time represented by n can be properly adjusted by the designer, depending on the actual requirements such as the property of liquid crystal material etc., so as to ensure the effective simulation of the impulse-type CRT display. And this is the most important advantage of the present invention over prior art.

For the sake of easy and convenient explanation and understanding, the waveform of the driving voltage pulse $V_{LC}$ output by the simulation device of the present Embodiment as shown above is the same as that of Embodiment 1, so as to avoid being too complicated to understand. However, the waveform can be designed to have various variations according to the actual requirements of the LCD display.

Embodiment 3

In the following analyses, please refer to FIGS. 7(*a*), 7(*b*) and FIGS. 8(*a*) to 8(*d*) as we explain the third embodiment of the present invention.

Figure 7A:
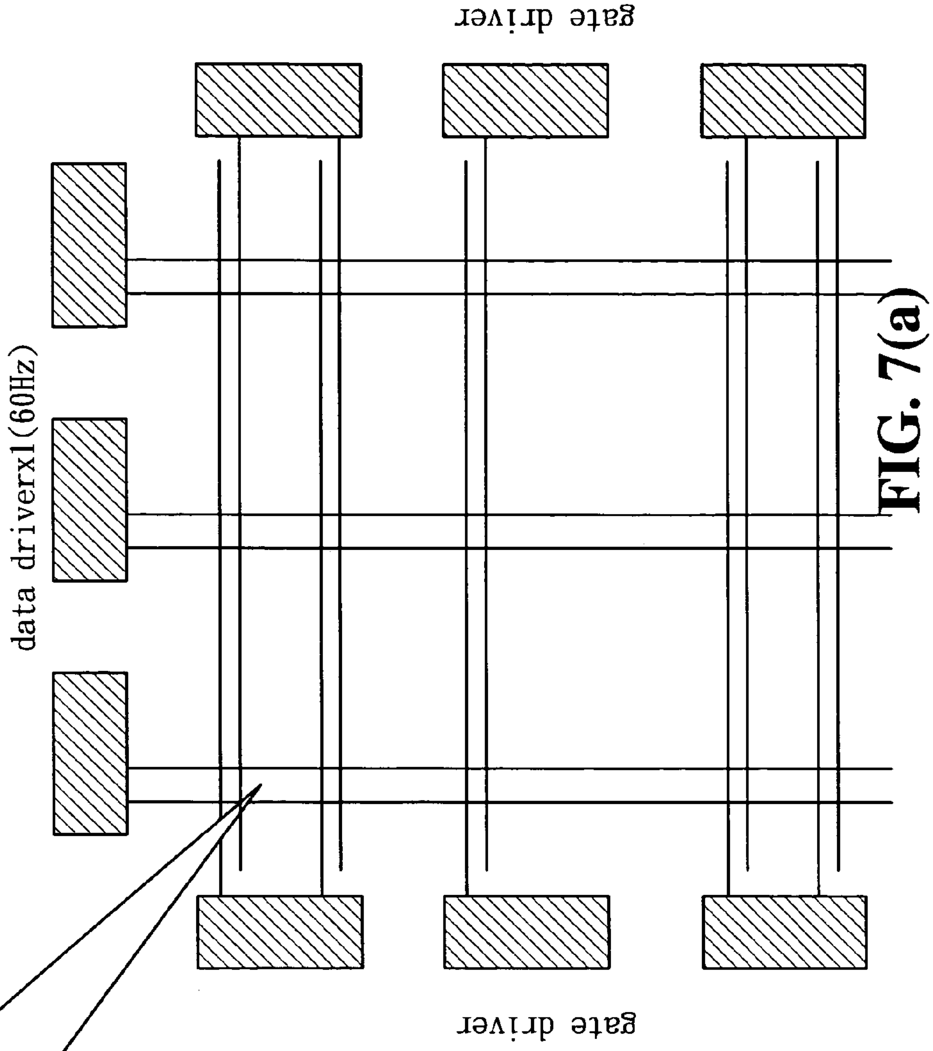
FIG. 7(*a*) is the schematic diagram indicating the pixel array formed by the cross points of a plurality of gate lines and data lines, and the driving circuit formed by a plurality of data drivers and gate drivers according to the third embodiment of the present invention.
Figure 7B:
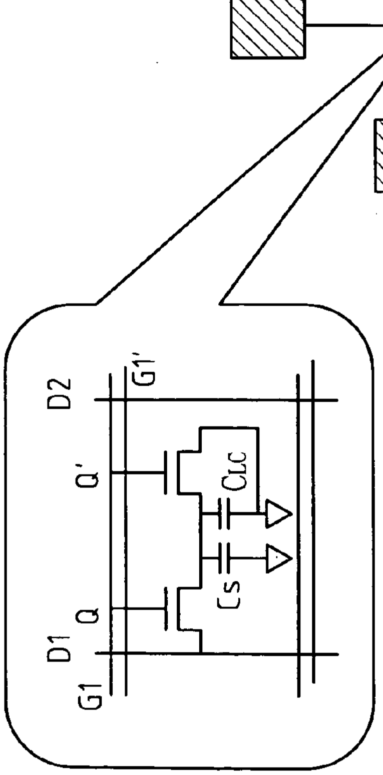

First, please refer to FIG. 7(*a*), which indicates: the pixel array formed by the cross points of a plurality of gate lines and data lines, and the driving circuit formed by a plurality of data drivers and gate drivers according to the third embodiment of the present invention. And FIG. 7(*b*) represents the simulation device according to the third embodiment.

Simulation Device

According to FIGS. 7(*a*) and 7(*b*), the simulation device comprises: a first input control line ($G_1$) connected to a first gate driver; a second input control line ($G_{1'}$); a first input data line ($D_1$); a first capacitor ($C_S$); a second capacitor ($C_{LS}$); a driving voltage output line; a first transistor (Q) having a gate connected to the first input control line ($G_1$), a source connected to the first input data line ($D_1$), and a drain connected to the driving voltage output line, the first capacitor ($C_S$), and the second drain of the second transistor (Q'); a second input control line connected to a second gate driver; and a second transistor (Q') having a gate connected to the second input control line ($G_{1'}$), a source connected to ground, a drain connected to the drain of the first transistor, the second capacitor ($C_{LC}$), and the driving voltage output line, wherein the first capacitor and the second capacitor are a storage capacitor and a liquid crystal equivalent capacitor, respectively, and are connected to ground; the storage capacitor has a first end connected to the driving voltage output line and a second end connected to ground; the liquid crystal equivalent capacitor has a first end connected to the driving voltage output line and a second end connected to ground; and the driving voltage output line is used to output the driving voltage used for simulation to the pixels of the LCD panel for displaying images; and it is characterized in that the first and second input control lines are connected to a first and second gate driver, respectively, and the first input data line is connected to a data driver; and the time difference between the waveforms of the periodic pulses of the first and second control signals and between voltage pulses applied to the first and second input control lines is the time difference across n scanning lines generated by n pulses, and which is adjustable.

Simulation Method

The following is the simulation method used for the simulation device, according to the third embodiment of the present invention, comprising the following steps: (I) providing a circuit having a first input control line, a second input control line, a first input data line, a first transistor, a second transistor, a first capacitor, a second capacitor, and a driving voltage output line; (II) providing a first control signal ($G_1$) with a periodic pulse waveform to the first input control line which is connected to a gate of the first transistor (Q) of the circuit; (III) providing a second control signal ($G_{1'}$) with a periodic pulse waveform to the second input control line which is connected to a second gate of the second transistor (Q') of the circuit, wherein the second control signal ($G_{1'}$) is the same as the first control signal ($G_1$) except for having the phase delay; (IV) providing a first data signal ($D_1$) to the first input data line which is connected to the source of the first transistor (Q) of the circuit; when the first transistor is activated by the first control signal ($G_1$), the first data signal ($D_1$) is fed to the driving voltage output line via the circuit; (V) when the second transistor is activated by the second control signal ($G_{1'}$), the ground potential voltage (code 0) is sent to the driving voltage output line via the circuit; and (VI) outputting an output driving voltages at the driving voltage output line generated by the above steps to the pixels for displaying images.

Waveform Analysis

In the following analysis, please refer to FIGS. 8(*a*) to 8(*d*), as we describe in detail the relations between the waveforms of the pulses of control voltages $G_1$, $G_{1'}$ and the pulses of the driving voltages $D_1$, $D_{1'}$, $V_{LC}$ generated by the simulation device of FIGS. 7(*a*) and 7(*b*) according to the third embodiment of the present invention.

Since usually AC voltage is utilized as the voltage for driving the liquid crystal, this voltage is in the form of alternating positive and negative phases during the control and driving processes of the liquid crystal (namely, the waveforms of the pulses of driving voltages $D_1$, $D_{1'}$ and $V_{LC}$ are in the form of alternating positive and negative phases relative to the reference voltage $V_{COM}$).

$V_{LC}$ is the output driving voltage generated at the driving voltage output line sequentially and periodically from time points A1 to A6 for (N−1)th, Nth, (N+1)th, and (N+2)th time frames in the following manner:

The value of driving voltage pulse $D_1$ in the (N−1)th frame before time point A1 is $V_{2'}$ (code 32), and the value of the driving voltage pulse $V_{LC}$ is $V_{1'}$ which is the ground voltage $V_{com}$ (since the source of the second transistor is connected to $V_{com}$); at time point A1, the waveform enters the Nth frame, at this time the value of the driving voltage pulse $D_1$ increases to $V_2$ (code 32) which is of positive polarity; and due to the activation of the control voltage pulse $G_1$, the value of the driving voltage pulse $V_{LC}$ thereby generated by the simulation device also increases from $V_{1'}$ to $V_2$ (code 32) which is of positive polarity, and it remains so until time point A2; then the time proceeds to time point A2, at this time, the value of driving voltage pulse $D_1$ is still $V_2$ (code 32); and due to the activation of control voltage pulse $G_{1'}$ (since the source of the second transistor is connected to $V_{com}$), the value of driving voltage pulse $V_{LC}$, as a result, is to drop momentarily from $V_2$ (code 32) to $V_1$ (code 0) which is equal to $V_{com}$, and is still of positive polarity; and this value is maintained until time point A3; then the time proceeds to time point A3 and enters the (N+1)th frame, at this time, the value of the driving voltage pulse $D_1$ drops to $V_{3'}$ (code 120), and is of negative polarity; and due to the activation of control voltage pulse $G_1$, the value of the driving voltage pulse $V_{LC}$ also momentarily drops from $V_1$ to $V_{3'}$ (code 120), which is of negative polarity, and it remains so until time point A4; then time proceeds to time point A4, and at this time, the value of driving voltage pulse $D_1$ is still $V_{3'}$ (code 120), which is of negative polarity, and due to the activation of control voltage pulse $G_{1'}$ (since the source of the second transistor is connected to $V_{com}$), the value of the driving voltage pulse $V_{LC}$, as a result, also increases to $V_{1'}$ which is equal to $V_{com}$ (code 0), and is still of negative polarity, and it remains so until time point A5; then time proceeds to time point A5 and starts to enter the (N+2)th frame, at this time, the value of the driving voltage pulse $D_1$ increases to $V_3$ (code 120); and due to the activation of the control voltage pulse $G_1$, the value of the driving voltage pulse $V_{LC}$, as a result, also increases momentarily from $V_{1'}$ to $V_3$ (code 120), which is of positive polarity, and it remains so until time point A6.

The variations of control voltage pulses $G_1$, $G_{1'}$ and driving voltage pulses $D_1$, $D_{1'}$ and $V_{LC}$ at the various time points after time points A6 can easily be inferred based on the above descriptions.

Figures 8A, 8B, 8C, 8D:
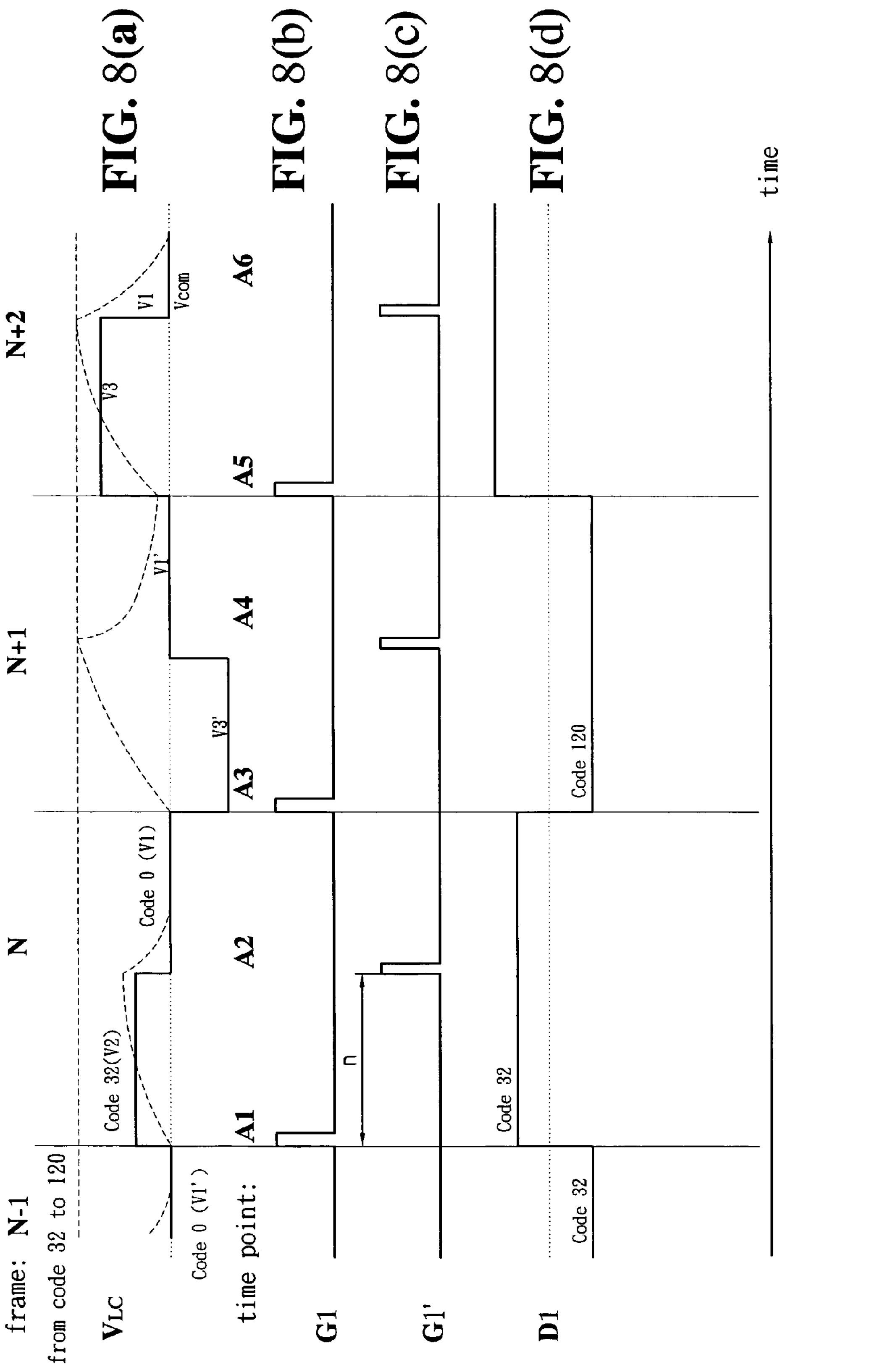
FIGS. 8(*a*) to 8(*d*) are the corresponding waveform diagrams of the control voltage pulse, the driving voltage pulse, and the liquid crystal optical response curve generated by the simulation device according to the third embodiment of the present invention.

The dotted line as shown in FIG. 8(*a*) is the liquid crystal optical response characteristic curve produced while performing the simulation drive. When the output driving voltage $V_{LC}$ of the simulation device between each time point is $V_{com}$ as shown in the figure, and when the output driving voltage $V_{LC}$ between each time point is $V_1$ or $V_{1'}$, a black line scanning is whereby performed on the display screen during this period; and by doing so, it can achieve the same results as inserting black frames or shutting off the backlights, so as to simulate the impulse-type CRT display.

In addition, the n shown at pulse $G_{1'}$ in the Nth frame as shown in FIG. 8(*c*) indicates n pulses, which means that there exists the time difference of n scanning lines between the control voltage pulse $G_1$ and $G_{1'}$ in the same frame, namely, from the standpoint of the pixel, another control driving pulse $G_{1'}$ will be inputted, at only n $G_1$ pulses after the first $G_1$ pulse. And this interval of time represented by n can be properly adjusted by the designer depending on the actual requirements such as the property of liquid crystal material etc., so as to ensure the effective simulation of the impulse-type CRT display. And this is the most important advantage of the present invention over prior art.

For the sake of easy and convenient explanation and understanding, the waveform of the driving voltage pulse $V_{LC}$ output by the simulation device of the present Embodiment as shown above is the same as that of Embodiment 1, so as to avoid being too complicated to understand. However, the waveform can be designed to have various variations according to the actual requirements of the LCD display.

Embodiment 4

In the following analyses, please refer to FIGS. 9(*a*), 9(*b*) and FIGS. 10(*a*) to 10(*d*) as we explain the fourth embodiment of the present invention.

Figures 9A, 9B:
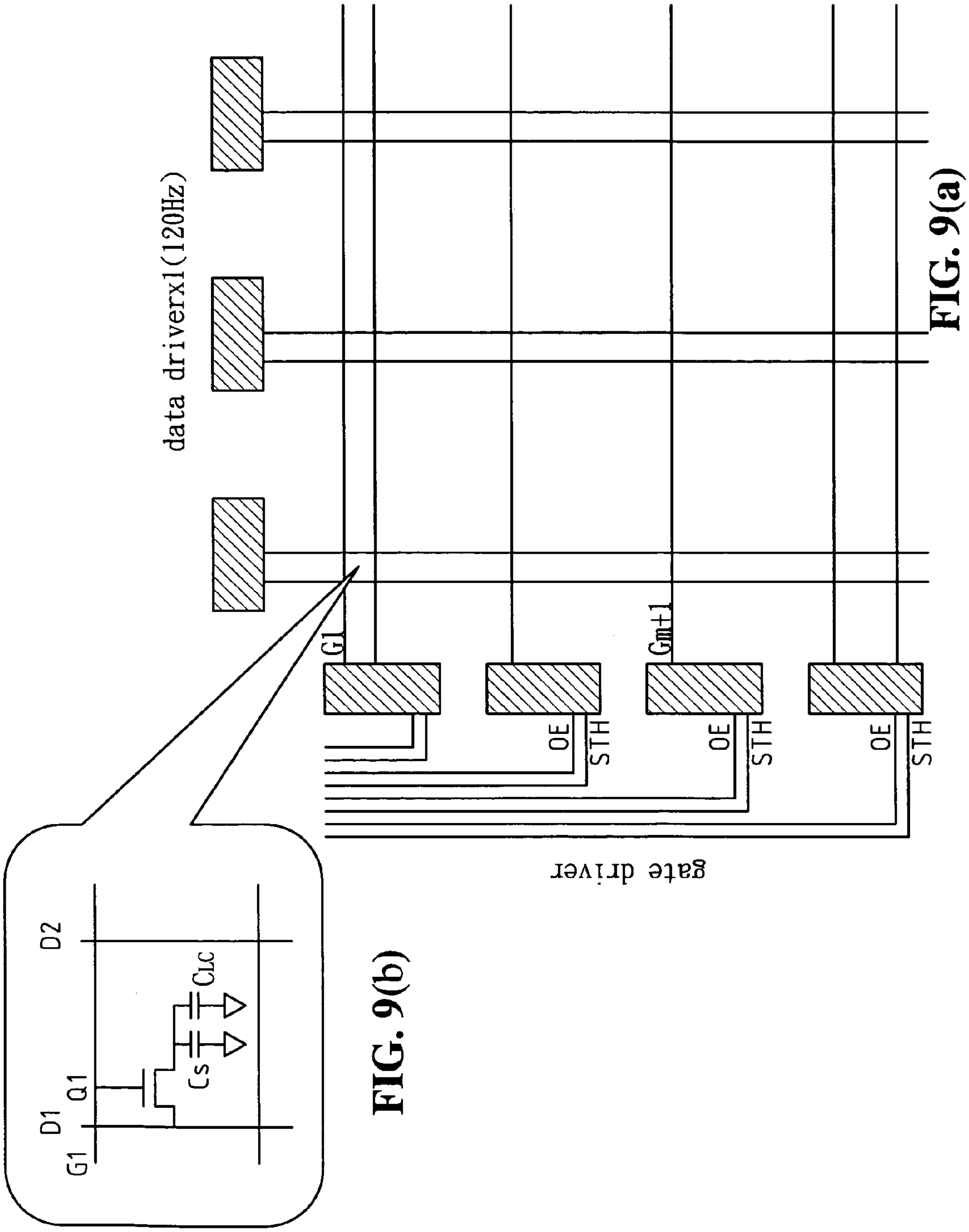
FIG. 9(*a*) is the schematic diagram indicating the pixel array formed by the cross points of a plurality of gate lines and data lines, and the driving circuit formed by a plurality of data drivers and gate drivers according to the fourth embodiment of the present invention.

First, please refer to FIG. 9(*a*), which indicates: the pixel array formed by the cross points of a plurality of gate lines and data lines, and the driving circuit formed by a plurality of data drivers and gate drivers according to the fourth embodiment of the present invention. And FIG. 9(*b*) represents the simulation device according to the fourth embodiment.

Simulation Device

According to FIGS. 9(*a*) and 9(*b*), the simulation device of the fourth Embodiment comprises: a first input control line ($G_1$) connected to a gate driver, the gate driver having an output enable control line and a start pulse horizontal control line; a second input control line ($G_m$) connected to the gate driver; a first input data line ($D_1$); a first capacitor ($C_S$); a second capacitor ($C_{LS}$); a driving voltage output line; and a first transistor (Q) comprising: a gate connected to the first input control line ($G_1$) or the second input control line ($G_m$), a source connected to the first input data line ($D_1$), and a drain connected to the driving voltage output line and two capacitors ($C_S$, $C_{LS}$) which are connected in parallel; and wherein the first capacitor and the second capacitor are a storage capacitor and a liquid crystal equivalent capacitor, respectively, and are connected to ground, the storage capacitor has a first end connected to the driving voltage output line and a second end connected to ground; the liquid crystal equivalent capacitor has a first end connected to the driving voltage output line and a second end connected to ground; and the driving voltage output line is used to output a driving voltage used for simulation to the pixels of the LCD panel for displaying images; and it is characterized in that the input data line is connected to a data driver; the input control line is connected to the gate driver. The gate driver contains: an output enable (OE) input line and a start pulse horizontal (STH) input line; and the gate driver receives the related control signals via the input lines, so as to generate the synchronous control voltage pulses $G_1$, $G_m$ according to control signals at the output enable and start pulse horizontal control lines for the first and second of the input control lines, and supplies them to the gate of the transistor via the first and second input control lines, and to generate the driving voltage pulse $V_{LC}$ through its control, and then be able to generate two synchronous scanning lines separated by m scanning lines on the display screen, for displaying images.

Simulation Method

The following is the simulation method used for the simulation device, according to the fourth embodiment of the present invention, comprising the following steps: (I) providing a circuit having a first input control line, a second input control line, a first input data line, a transistor, a first capacitor, a second capacitor, and a driving voltage output line; (II) providing a first data signal (D1) with periodic pulse waveform to the first input data line which is connected to the source of the first transistor (Q1), and when activated by the two synchronous control signals G1, Gm, the circuit feeds the data signal to the driving voltage output line via the circuit; (III) providing control signals OE and STH to a gate driver, so as to generate the synchronous control signals G1, Gm, and providing them to control a gate of the transistor (Q1) via the first and second input control lines; and (IV) outputting an output driving voltage generated at the driving voltage output line by the above steps to the pixels for displaying images.

Waveform Analysis

In the following, please refer to FIGS. 10(*a*) to 10(*d*), as we describe in detail the relations between the waveforms of the pulses of control voltages $G_1$, $G_m$ and the pulses of the driving voltages $D_1$, $V_{LC}$ generated by the simulation device of FIGS. 9(*a*) and 9(*b*) according to the fourth embodiment of the present invention.

Since usually AC voltage is utilized as the driving voltage for driving the liquid crystal, this voltage is in the form of alternating positive and negative phases during the control and driving processes of the liquid crystal (namely, the waveforms of the pulses of driving voltages $D_1$ and $V_{LC}$ are in the form of alternating positive and negative phases relative to the reference voltage $V_{COM}$).

$V_{LC}$ is the output driving voltage generated at the driving voltage output line sequentially and periodically from time points A1 to A6 for (N−1)th, Nth, (N+1)th, and (N+2)th time frames in the following manner:

The value of driving voltage pulse $D_1$ in the (N−1)th frame before time point A1 is $V_{1'}$ (code 0), and the value of the driving voltage pulse $V_{LC}$ is $V_{1'}$ (code 0), which is of negative polarity; at time point A1, the waveform enters the Nth frame; at this time, the value of the driving voltage pulse $D_1$ increases to $V_2$ (code 32) which is of positive polarity; and due to the activation of the control voltage $G_1$, the driving voltage pulse $V_{LC}$ generated by the simulation device therefore also increases from $V_1$ to $V_2$ (code 32), which is of positive polarity, and remains to be so until time point A2; then the time proceeds to time point A2, and at this time, the value of driving voltage pulse $D_1$ is $V_1$ (code 0) which is still of positive polarity, and due to the activation of control voltage pulse $G_1$, the value of driving voltage pulse $V_{LC}$, as a result, is to drop momentarily from $V_2$ (code 32) to $V_1$ (code 0), and the driving voltage pulse $V_{LC}$ is still of positive polarity; and this value is maintained until time point A3; then the time proceeds to time point A3 and enters the (N+1)th frame, and at this time, the value of the driving voltage pulse $D_1$ drops to $V_{3'}$ (code 120), and is of negative polarity; and due to the activation of control voltage pulse $G_1$, the value of the driving voltage pulse $V_{LC}$ also momentarily drops from $V_1$ to $V_{3''}$ (code 120), which is of negative polarity, and it remains so until time point A4; then time proceeds to A4, at this time, the value of driving voltage pulse $D_1$ is still $V_{1'}$ (code 0); and due to the activation of control voltage pulse $G_1$, the value of the driving voltage pulse $V_{LC}$, as a result, also increases from $V_{3'}$ to $V_{1'}$ (code 0), and is still of negative polarity until time point A5; then time proceeds to time point A5 and starts to enter the (N+2)th frame, and at this time, the value of the driving voltage pulse $D_1$ increases to $V_3$ (code 120) which is of positive polarity; and due to the activation of the control voltage pulse $G_1$, the value of the driving voltage pulse $V_{LC}$, as a result, also increases momentarily from $V_{1'}$ to $V_3$ (code 120), which is of positive polarity, and it remains so until time point A6.

The variations of control voltage pulses $G_1$, $G_{1'}$ and driving voltage pulses $D_1$, and $V_{LC}$ at the various time points after time points A6 can easily be inferred based on the above descriptions.

Figures 10A, 10B, 10C, 10D:
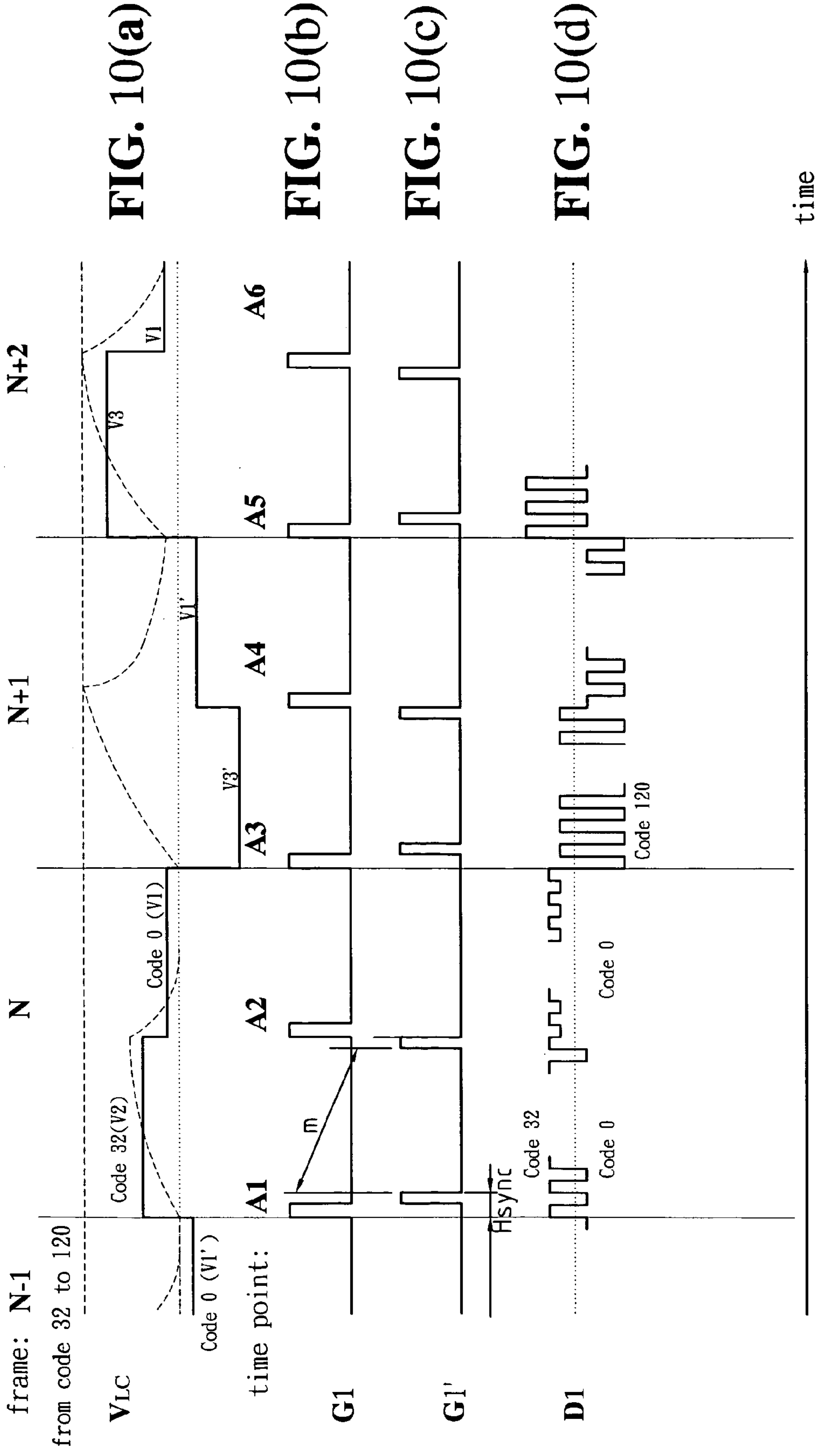
FIGS. 10(*a*) to 10(*d*) are the corresponding waveform diagrams of the control voltage pulse, the driving voltage pulse, and the liquid crystal optical response curve generated by the simulation device according to the fourth embodiment of the present invention.

The dotted line as shown in FIG. 10 (*a*) is the liquid crystal display optical response characteristic curve produced while performing the simulation drive. When the output driving voltage $V_{LC}$ of the simulation device between each time point is code 0 as shown in the figure, wherein when the output driving voltage $V_{LC}$ between each time point is $V_1$ or $V_{1'}$, the black line scanning is whereby performed on the display screen during this period, and by doing so, it can achieve the same results as inserting black frames or shutting off the backlights, so as to simulate the impulse-type CRT display.

The symbol Hsync in FIG. 10(*c*) indicates that the control voltage pulses $G_1$ and $G_m$ are synchronous signals.

Therefore, according to the design of the present Embodiment, $G_m$ and $G_1$ are synchronous control voltage pulses. The scanning line generated by the $G_m$ control and the scanning line generated by $G_1$ control are separated on the screen by m−1 scanning lines; and these two scanning lines execute scanning on the display screen in a synchronous manner. And the relations between the waveforms of control voltage pulse $G_m$ and driving voltage pulse $D_1$, $V_{LC}$ are the same as those between the waveforms of control voltage pulse $G_1$ and driving voltage pulse $D_1$, $V_{LC}$ (namely, the description above regarding FIGS. 10(*a*) to 10(*d*)), therefore, it will not be repeated here.

For the sake of easy and convenient explanation and understanding, the waveform of the driving voltage pulse $V_{LC}$ output by the simulation device of the present Embodiment as shown above is the same as that of Embodiment 1, so as to avoid being too complicated to understand. However, the waveform can be designed to have various variations according to the actual requirements of the LCD display.

It must be particularly emphasized here that regardless of the positive or negative polarity of the liquid crystal driving voltage pulse $V_{LC}$, as long as it can attain the predetermined target level, it is then able to achieve the purpose and effectiveness of accelerated driving of the optical response of liquid crystal and simulating the CRT display.

In addition, according to the design features of the present invention, the separation of m scanning lines between two subsequent control voltage pulses $G_1$ (FIG. 10(*b*)) and $G_m$ (FIG. 10(*c*)) in the same frame (for example the Nth frame) can be adjusted depending on the actual effectiveness desired to be achieved and the design requirements. And this is the important invention and feature of the present case, and it is not disclosed in all the related prior art.

Embodiment 5

In the following, please refer to FIGS. 11(*a*), 11(*b*) and FIGS. 12(*a*) to 12(*e*) as we explain the fifth embodiment of the present invention. And FIGS. 11(*a*) and 11(*b*) are used to describe the fifth Embodiment and the subsequent sixth Embodiment of the present invention, its purpose is to indicate that: different image display effects can be achieved on the display screen by utilizing different control methods with the same device, and this characteristic will be discussed as follows.

Figure 11A:
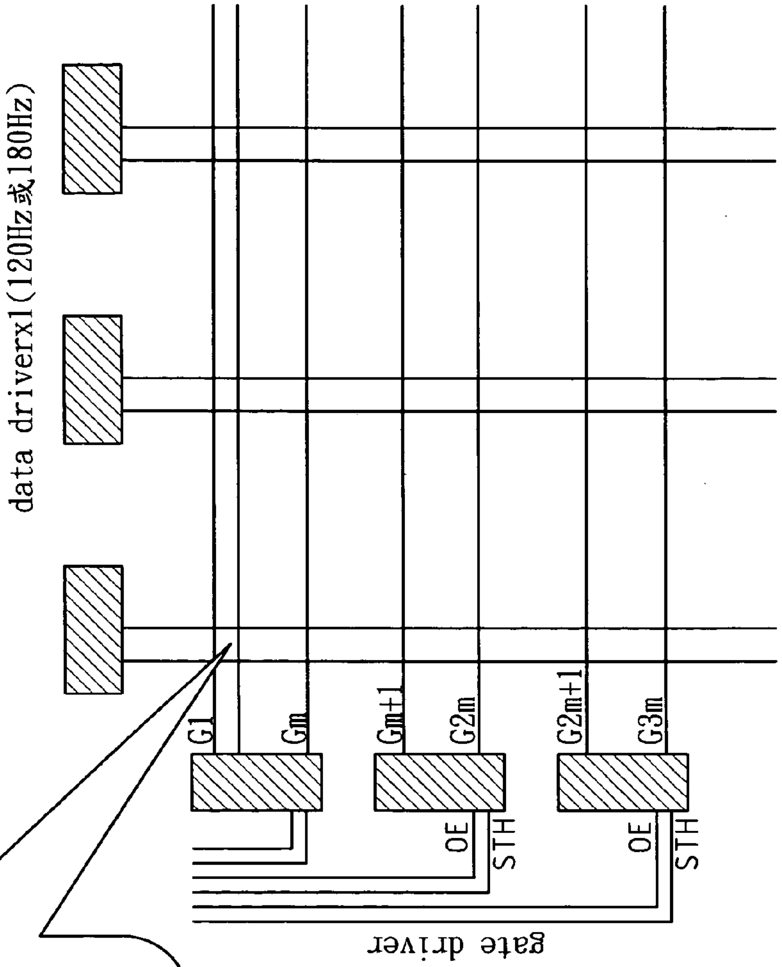
FIG. 11(*a*) is the schematic diagram indicating the pixel array formed by the cross points of a plurality of gate lines and data lines, and the driving circuit formed by a plurality of data drivers and gate drivers according to the fifth and sixth embodiments of the present invention.
Figure 11B:
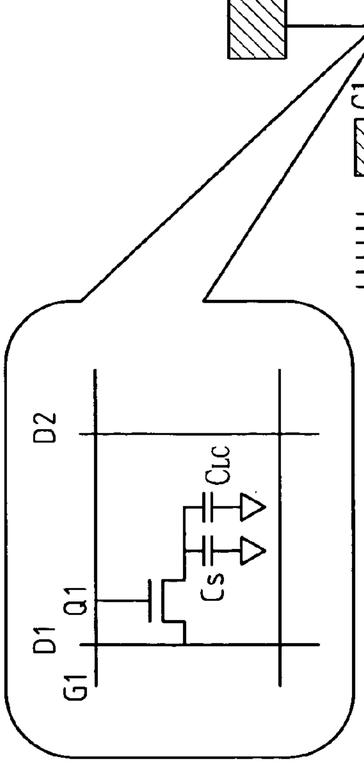

First, please refer to FIG. 11(*a*), which indicates: the pixel array formed by the cross points of a plurality of gate lines and data lines, and the driving circuit formed by a plurality of data drivers and gate drivers according to the fifth embodiment of the present invention. And FIG. 11(*b*) represents the simulation device according to the fifth embodiment.

Simulation Device

According to FIGS. 11(*a*) and 11(*b*), the simulation device of the fifth Embodiment comprises: a first input control line ($G_1$) connected to a gate driver, the gate driver having first, second, and third output enable control lines and first, second, and third start pulse horizontal control lines for generating three sets of control voltage pulses, each having two synchronous control voltage pulses periodically; a second input control line ($G_{m+1}$) connected to the gate driver; a third input control line ($G_{2m+1}$) connected to the gate driver; a first input data line ($D_1$); a first capacitor ($C_S$); a second capacitor ($C_{LS}$); and a driving voltage output line; and a first transistor (Q) comprising a gate connected to the first input control line ($G_1$), the second input control line ($G_{m+1}$), or the third input control line ($G_{2m+1}$); a source connected to the first input data line ($D_1$), and a drain connected to the driving voltage output line and two capacitors ($C_S$, $C_{LS}$) connected in parallel, and wherein the first capacitor and the second capacitor are a storage capacitor and a liquid crystal equivalent capacitor, respectively, and are connected to ground; the storage capacitor has a first end connected to the driving voltage output line and a second end connected to ground; the liquid crystal equivalent capacitor has a first end connected to the driving voltage output line and a second end connected to ground; and the driving voltage output line is used to output the driving voltage used for simulation to a plurality of pixels of the LCD panel for displaying images; and it is characterized in that, the input data line is connected to a data driver; the input control line is connected to the gate driver; the gate driver contains: the first, the second, and the third output enable (OE) input lines and the first, the second, and the third start pulse horizontal (STH) input lines; and the gate driver receives the related control signals via the input lines. The output enable (OE) signals input by the gate drivers are so controlled that the two sets of synchronous control voltage pulses generated at the output of the gate drivers are selected from the following three sets of control voltage pulses: (1) ($G_1$, $G_m$), (2) ($G_{m+1}$, $G_{2m}$), (3) ($G_{2m+1}$, $G_{3m}$); and these two sets of control voltage pulses (1, 3), or (1, 2), or (2, 3) are selected from the three sets of control voltage pulses according to control signals at the output enable and start pulse horizontal control lines to provide the synchronous control voltage pulses and then are configured to be such that they are provided to the gate of the transistors through the corresponding first, or second, or third input control line for controlling the transistor in a cyclic alternating manner, and the driving voltage pulse $V_{LC}$ generated through the control of the gate can be used to drive the pixels to simultaneously generate two synchronous scanning lines separated by 2m scanning lines on the display screen in a cyclic alternating manner for displaying images.

Simulation Method

The following is the simulation method used for the simulation device according to the fifth embodiment of the present invention, comprising the following steps: (I) providing a circuit having first, second, and third input control lines, a first input data line, a transistor, a first capacitor, a second capacitor, and a driving voltage output line; (II) providing a data signal (D1) with periodic pulse waveform to the first input data line which is connected to a source of the transistor (Q1), and when activated by the two synchronous control voltage pulses, the circuit feeds the first data signal to the driving voltage output line via the circuit; (III) providing the first, second, and third OE and STH control signals to the first, second, and third output enable (OE) input lines and start pulse horizontal (STH) input lines of the gate driver, and receiving the related control signals via the input lines, the output enable (OE) signals input by the gate drivers are so controlled that the two sets of synchronous control voltage pulses generated at the output of the gate drivers are selected from the following three sets of control voltage pulses: (1) ($G_1$, $G_m$), (2) ($G_{m+1}$, $G_{2m}$), (3) ($G_{2m+1}$, $G_{3m}$); and these two sets of control voltage pulses (1,3), or (1, 2), or (2, 3) are selected from the three sets of control voltage pulses and are configured to be such that they are provided to control a gate of the transistors (Q1) through the corresponding first, second, or third input control lines in a cyclic alternating manner; and it is characterized in that when activated by the two sets of synchronous control signals (1, 3), or (1, 2), or (2, 3), the data signal is sent to the driving voltage output line via the circuit; and (III) outputting an output driving voltage generated at the driving voltage output line by the above steps to the pixels, so as to simultaneously generate two synchronous scanning lines separated by 2m scanning lines on the display screen in a cyclic alternating manner for displaying images.

Waveform analysis

In the following analysis, please refer to FIGS. 12(*a*) to 12(*e*) as we describe in detail the relations between the waveforms of the pulses of control voltages ($G_1$, $G_m$), ($G_{m+1}$, $G_{2m}$), ($G_{2m+1}$, $G_{3m}$) and the pulses of the driving voltages $D_1$, $V_{LC}$ generated by the simulation device of FIGS. 11(*a*) and 11(*b*) according to the fifth embodiment of the present invention.

Since usually AC voltage is utilized as the driving voltage for driving the liquid crystal, therefore, this voltage is in the form of alternating positive and negative phases during the control and driving process of the liquid crystal (namely, the waveforms of the pulses of driving voltages $D_1$, $V_{LC}$ are in the form of alternating positive and negative phases relative to the reference voltage $V_{COM}$).

$V_{LC}$ is the output driving voltage generated at the driving voltage output line sequentially and periodically from time points A1 to A6 for (N−1)th, Nth, (N+1)th, and (N+2)th time frames in the following manner:

The value of driving voltage pulse $D_1$ in the (N−1)th frame before time point A1 is $V_{1'}$ (code 0), and the value of the driving voltage pulse $V_{LC}$ is $V_{1'}$ (code 0), which is of negative polarity; at time point A1, the waveform enters the Nth frame, at this time, the value of the driving voltage pulse $D_1$ increases to $V_2$ (code 32) which is of positive polarity, and due to the activation of the control voltage $G_1$, the value of output driving voltage pulse $V_{LC}$ thereby generated by the simulation device also increases from $V_1$ to $V_2$ (code 32) of positive polarity, and it remains so until time point A2; then the time proceeds to time point A2, and at this time, the value of driving voltage pulse $D_1$ is $V_1$ (code 0), and due to the activation of control voltage pulse $G_1$, the value of driving voltage pulse $V_{LC}$, as a result, is to drop momentarily from $V_2$ (code 32) to $V_1$ (code 0), and is still of positive polarity, and this value is maintained until time point A3; then the time proceeds to time point A3 and enters the (N+1)th frame, and at this time, the value of the driving voltage pulse $D_1$ drops to $V_{3'}$ (code 120) which is negative polarity; and due to the activation of control voltage pulse $G_1$, the value of the driving voltage pulse $V_{LC}$ also momentarily drops from $V_1$ to $V_{3'}$ (code 120), which is of negative polarity, and it remains so until time point A4; then time proceeds to A4, at this time, the value of driving voltage pulse $D_1$ is still $V_{1'}$ (code 0), and due to the activation of control voltage pulse $G_1$, the value of the driving voltage pulse $V_{LC}$, as a result, also increases from $V_{3'}$ to $V_{1'}$ (code 0), and is still of negative polarity until time point A5; then time proceeds to time point A5 and starts to enter the (N+2)th frame, at this time, the value of the driving voltage pulse $D_1$ increases to $V_3$ (code 120) which is of positive polarity, and due to the activation of the control voltage pulse $G_1$, the value of the driving voltage pulse $V_{LC}$, as a result, also increases momentarily from $V_{1'}$ to $V_3$ (code 120), which is of positive polarity, and it remains so until time point A6.

The variations of control voltage pulses $G_{m+1}$, $G_{2m+1}$ and driving voltage pulses D1, and $V_{LC}$ at the various time points after time points A6 can easily be inferred based on the above descriptions.

Figures 12A, 12B, 12C, 12D, 12E:
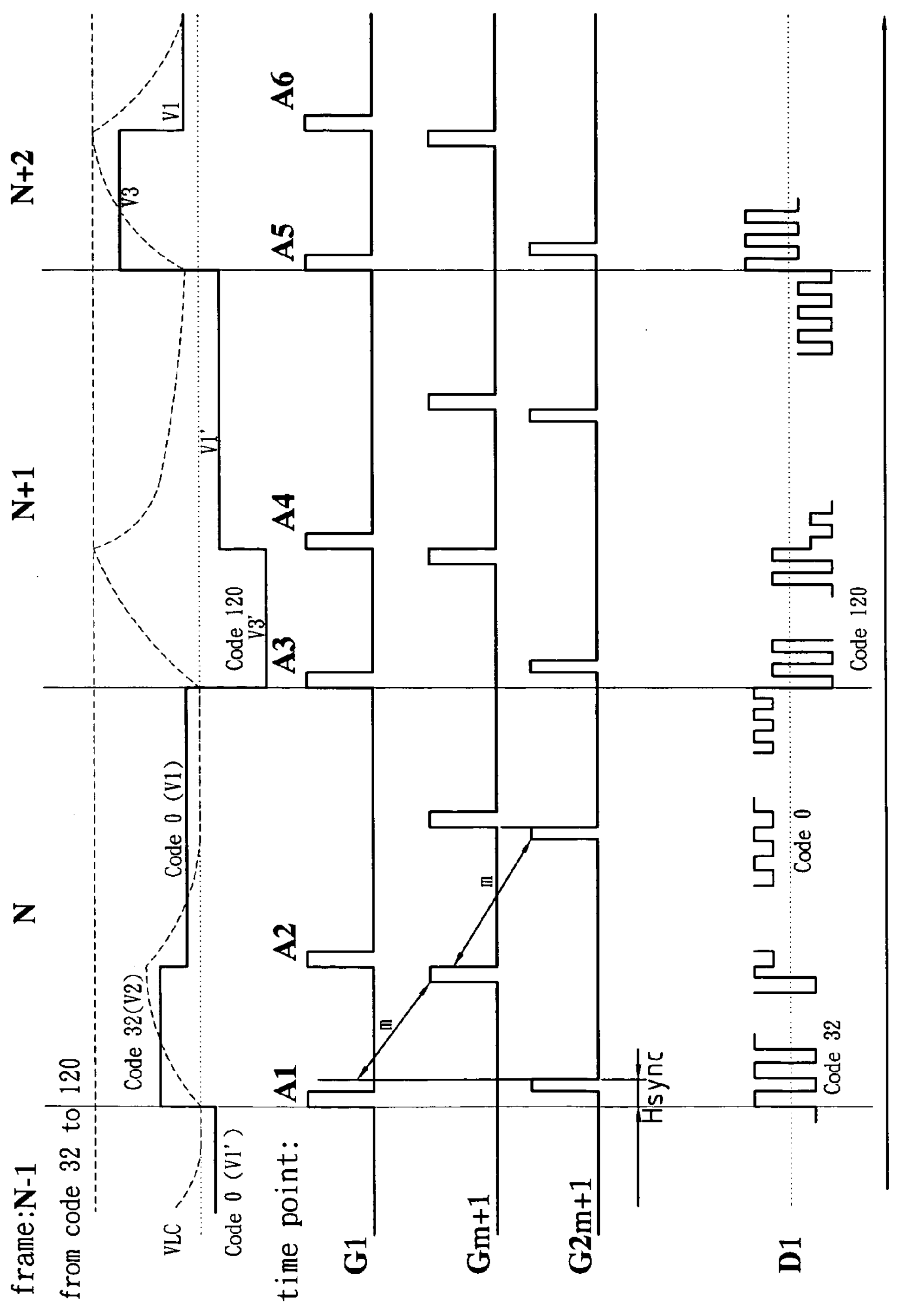
FIGS. 12(*a*) to 12(*e*) are the corresponding waveform diagrams of the control voltage pulse, the driving voltage pulse, and the liquid crystal optical response curve generated by the simulation device according to the fifth embodiment of the present invention.

The dotted line as shown in FIG. 12(*a*) is the liquid crystal display optical response characteristic curve produced while performing the simulation drive. When the output driving voltage $V_{LC}$ of the simulation device between each time point is code 0 as shown in the figure, wherein when the output driving voltage $V_{LC}$ between each time point is $V_1$ or $V_{1'}$, the black line scanning is whereby performed on the display screen during this period, and by doing so, it is able to simulate the impulse-type CRT display.

For the sake of easy and convenient explanation and understanding, the waveform of the driving voltage pulse $V_{LC}$ output by the simulation device of the present Embodiment as shown above is the same as that of Embodiment 6, so as to avoid being too complicated to understand. However, the waveform can be designed to have various variations according to the actual requirements of the LCD display.

In summary, the purpose of the present invention is to generate two synchronous scanning lines on the display screen as shown in FIGS. 12 (*b*), 12(*c*) and 12(*d*). $G_1$, $G_{m+1}$, $G_{2m+1}$ are synchronous control voltage pulses, and two sets of scanning lines are generated on the display screen by the driving voltage pulses generated through the control of the control voltage pulses, and to perform synchronous scanning separated by 2m scanning lines for displaying images.

Embodiment 6

In the following analyses, please refer to FIGS. 11(*a*), 11(*b*) and FIGS. 13(*a*) to 13(*e*) as we explain the sixth embodiment of the present invention. And FIGS. 11(*a*) and 11(*b*) are used to describe the sixth Embodiment and the preceding fifth Embodiment of the present invention, its purpose is to indicate that: different image displaying effects can be achieved on the display screen by utilizing different control methods with the same device, and this characteristic will be discussed as follows.

First, please refer to FIG. 11(*a*), which indicates: the pixel array formed by the cross points of a plurality of gate lines and data lines, and the driving circuit formed by a plurality of data drivers and gate drivers according to the sixth embodiment of the present invention. And FIG. 11(*b*) represents the simulation device according to the sixth embodiment.

Simulation Device

According to FIGS. 11(*a*) and 11(*b*), the simulation device of the sixth Embodiment comprises: a first input control line ($G_1$); a second input control line ($G_{m+1}$) connected to the gate driver; a third input control line ($G_{2m+1}$) connected to the gate driver; a first input data line ($D_1$); a first capacitor ($C_S$); a second capacitor ($C_{LS}$); a driving voltage output line; and a first transistor (Q) comprising a gate connected to the first input control line ($G_1$) or the second input control line ($G_{m+1}$) or the third input control line ($G_{2m+1}$); a source connected to the first input data line ($D_1$), and a drain connected to the driving voltage output line and two capacitors ($C_S$, $C_{LS}$), which are connected in parallel, wherein the first capacitor and the second capacitor are the storage capacitor and the liquid crystal equivalent capacitor, respectively, and are connected to ground; the storage capacitor has a first end connected to the driving voltage output line and a second end connected to ground; the liquid crystal equivalent capacitor has a first end connected to the driving voltage output line and a second end connected to ground; and the driving voltage output line is used to output the driving voltage used for simulation to the pixels of the LCD panel for displaying images; and it is characterized in that the input data line is connected to a data driver, and the input control line is connected to the gate driver. The gate driver contains: the first, second, and third output enable (OE) input lines and the first, second, and third start pulse horizontal (STH) input lines; and the gate driver receives the related control signals via the input lines; the output enable (OE) signals input by the gate drivers are so controlled that the three sets of synchronous control voltage pulses generated at the output of the gate drivers are formed by and selected from the following three sets of control voltage pulses: (1) ($G_1$, $G_m$), (2) ($G_{m+1}$, $G_{2m}$), (3) ($G_{2m+1}$, $G_{3m}$); and these three sets control voltage pulses (1, 2, 3) are provided to the gate of the transistors (Q1) through the corresponding first, or second, and third input control lines for controlling the transistor, and it is characterized in that when activated by the three sets of synchronous control signals (1, 2, 3), the data signal is fed to the driving voltage output line via the circuit; and the driving voltage pulse $V_{LC}$ generated through the control of the gate can be used to drive the pixels to simultaneously generate three synchronous scanning lines separated by m scanning lines on the display screen for displaying images.

Simulation Method

The following is the simulation method used for the simulation device according to the sixth embodiment of the present invention, comprising the following steps: (I) providing a circuit having first, second, and third input control lines, a first input data line, a transistor, a first capacitor, a second capacitor, and a driving voltage output line; (III) providing the OE and STH control signals to the first, second, and third output enable (OE) input lines and start pulse horizontal (STH) input lines of the gate driver, and receiving the related control signals via the input lines, the output enable (OE) signals input by the gate drivers are so controlled that the three sets of synchronous control voltage pulses generated at the output of the gate drivers are selected from the following three sets of control voltage pulses: (1) ($G_1$, $G_m$), (2) ($G_{m+1}$, $G_{2m}$), (3) ($G_{2m+1}$, $G_{3m}$); (III) and these three sets of control voltage pulses (1,2,3) are provided to the gate of the transistors (Q1) through the corresponding first, second and third input control lines; and it is characterized in that when activated by the three sets of synchronous control signals (1, 2, 3), the data signal is fed to the driving voltage output line via the circuit when the transistor is activated by the control voltage pulses; (IV) providing a first data signal (D1) with periodic pulse waveform to the first input data line which is connected to a source of the first transistor (Q1); and (V) outputting the output driving voltage generated at the driving voltage output line by the above steps to the pixels, so as to simultaneously generate three synchronous scanning lines separated by m scanning lines on the display screen in a cyclic alternating manner for displaying images.

Waveform analysis

In the following analysis, please refer to FIGS. 13(*a*) to 13(*e*) as we describe in detail the relations between the waveforms of the pulses of control voltages ($G_1$, $G_m$), ($G_{m-1}$, $G_{2m}$), ($G_{2m+1}$, $G_{3m}$) and the pulses of the driving voltages $D_1$, $V_{LC}$ generated by the simulation device of FIGS. 11(*a*) and 11(*b*) according to the sixth embodiment of the present invention.

Since usually AC voltage is utilized as the driving voltage for driving the liquid crystal, this voltage is in the form of alternating positive and negative phases during the control and driving process of the liquid crystal (namely, the waveforms of the pulses of driving voltages $D_1$, $V_{LC}$ are in the form of alternating positive and negative phases relative to the reference voltage $V_{COM}$).

$V_{LC}$ is the output driving voltage generated at the driving voltage output line sequentially and periodically from time points A1 to A6 for (N−1)th, Nth, (N+1)th, and (N+2)th time frames repeatedly in the following manner:

The value of driving voltage pulse $D_1$ in the (N−1)th frame before time point A1 is $V_{1'}$ (code 0) which is of negative polarity, and the value of the driving voltage pulse $V_{LC}$ is $V_{1'}$ (code 0), which is of negative polarity; at time point A1, the waveform enters the Nth frame, and at this time the value of the driving voltage pulse $D_1$ increases to V2 (code 32) which is of positive polarity; and due to the activation of the control voltage $G_1$, the value of output driving voltage pulse $V_{LC}$ thereby generated by the simulation device also increases from $V_{1'}$ to $V_2$ (code 32), which is of positive polarity, and it remains so until time point A2; then the time proceeds to time point A2, and at this time, the value of driving voltage pulse $D_1$ is $V_1$ (code 0), and due to the activation of control voltage pulse $G_1$, the value of driving voltage pulse $V_{LC}$, as a result, is to drop momentarily from $V_2$ (code 32) to $V_1$ (code 0), and is still of positive polarity, and this value is maintained until time point A3; then the time proceeds to time point A3 and enters the (N+1)th frame, at this time, the value of the driving voltage pulse $D_1$ drops to $V_{3'}$ (code 120), and due to the activation of control voltage pulse $G_1$, the value of the driving voltage pulse $V_{LC}$ also momentarily drops from $V_1$ to $V_{3'}$ (code 120), which is of negative polarity, and it remains so until time point A4; then time proceeds to A4, at this time, the value of driving voltage pulse $D_1$ is still $V_{1'}$ (code 0), and due to the activation of control voltage pulse $G_1$, the value of the driving voltage pulse $V_{LC}$, as a result, also increases from $V_{3'}$ to $V_{1'}$ (code 0), and is still of negative polarity until time point A5; then time proceeds to time point A5 and starts to enter the (N+2)th frame, at this time, the value of the driving voltage pulse $D_1$ increases to $V_3$ (code 120), and due to the activation of the control voltage pulse $G_1$, the value of the driving voltage pulse $V_{LC}$, as a result, also increases momentarily from $V_{1'}$ to $V_3$ (code 120), which is of positive polarity, and it remains so until time point A6.

The variations of control voltage pulses $G_{m+1}$, $G_{2m+1}$ and driving voltage pulses $D_1$, and $V_{LC}$ at the various time points after time points A6 can easily be inferred based on the above descriptions.

Figures 13A, 13B, 13C, 13D, 13E:
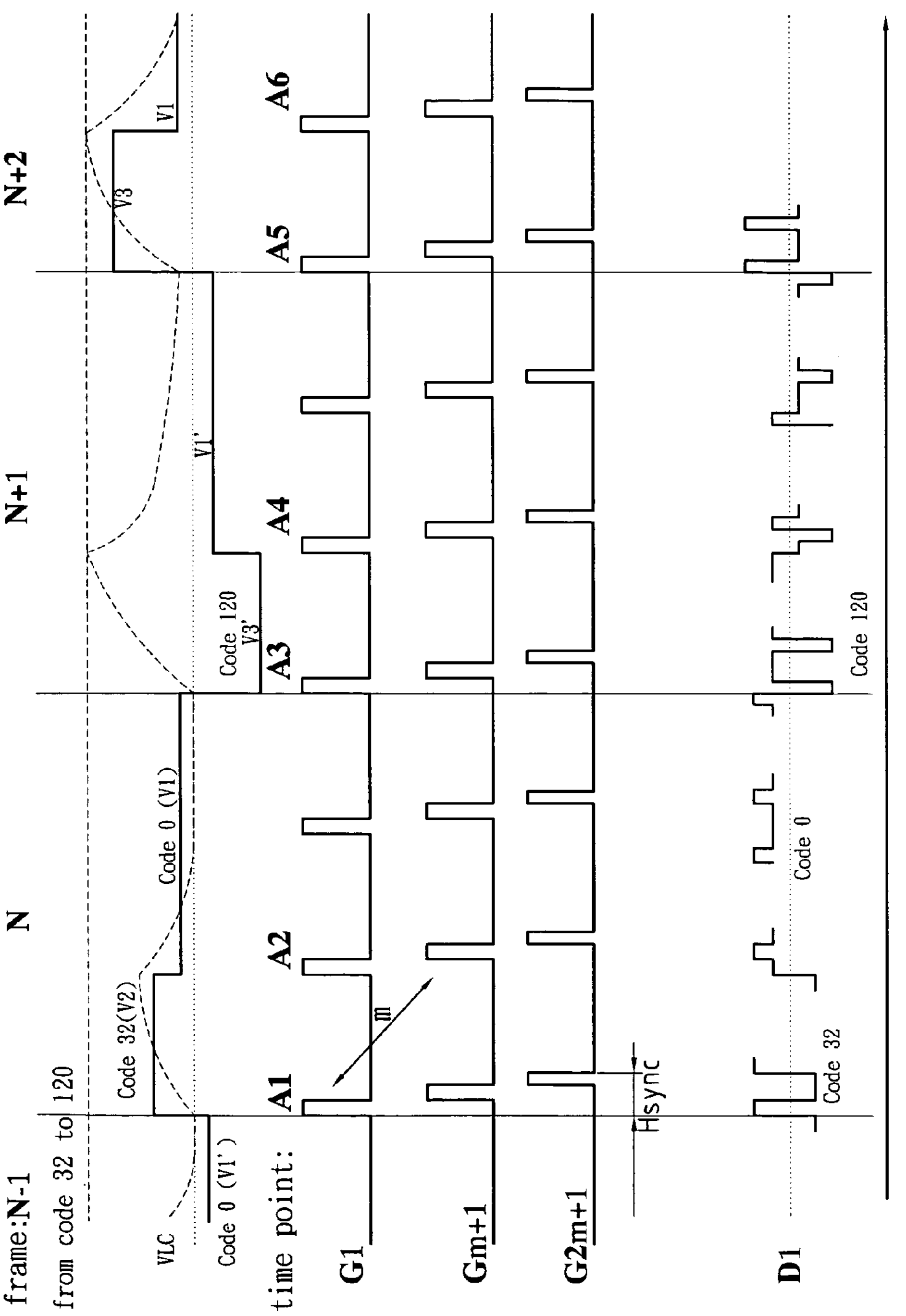
FIGS. 13(*a*) to 13(*e*) are the corresponding waveform diagrams of the control voltage pulse, the driving voltage pulse, and the liquid crystal optical response curve generated by the simulation device according to the six embodiment of the present invention.

The dotted line as shown in FIG. 13(*a*) is the liquid crystal display optical response characteristic curve produced while performing the simulation drive. When the output driving voltage $V_{LC}$ of the simulation device between each time point is code 0 as shown in the figure, wherein when the output driving voltage $V_{LC}$ between each time point is $V_1$ or $V_{1'}$, a black line scanning is whereby performed on the display screen during this period, and by doing so, it is able to simulate the impulse-type CRT display.

In summary, the purpose of the present invention is to generate three synchronous scanning lines on the display screen as shown in FIGS. 13 (*b*), 13*c*) and 13(*d*). $G_1$, $G_{m+1}$, $G_{2m+1}$ are synchronous control voltage pulses, and three sets of scanning lines are generated on the display screen by the driving voltage pulses generated through the control of the control voltage pulses, and perform the synchronous line scanning on the screen separated by m scanning lines for displaying images.

Therefore, according to the design of the present invention, $G_{m+1}$ and $G_1$ are synchronous control voltage pulses, and the scanning lines generated through the control of $G_{m+1}$ and the scanning lines generated through the control of $G_1$ are separated by m scanning lines on the screen, and these two sets of scanning lines perform scanning on the screen in a synchronous manner, namely, start scanning on the screen from the first and the (m+1)th scanning lines respectively.

The relations between the waveforms of the control voltage pulses $G_{m+1}$ and the driving voltage pulses $D_1$, $V_{LC}$ are the same as those between waveforms of the control voltage pulse $G_1$ and the driving voltage pulses $D_1$, $V_{LC}$ (namely, as explained above with reference to FIGS. 13(*a*) to 13(*e*)), therefore, it will not be repeated here.

And at the same time, the corresponding driving voltage pulses generated by the control voltage pulses ($G_{m+1}$, $G_{2m}$), ($G_{2m+1}$, $G_{2m}$), and the resulting scanning lines generated on the screen, start scanning lines generated on the screen, start scanning from the (m+1)th, (2m+1)th scanning lines downward on the screen respectively in a synchronous manner (namely, the three sets of scanning lines generated on the display screen by the present embodiment, start scanning downward synchronously from the first, (m+1)th and (2m+1)th scanning lines in a repeated cyclic manner). And the relations between the waveforms of the respective control voltage pulses ($G_{m+1}$, $G_{2m}$), ($G_{2m+1}$, $G_{3m}$) and the driving voltage pulses $D_1$, $V_{LC}$ are the same as those between the waveforms of the respective control voltage pulses ($G_1$, $G_m$) and driving voltage pulse $D_1$, $V_{LC}$ (namely, as explained above with reference to FIGS. 13(*a*) to 13(*e*)). Therefore, it will not repeated here.

For the sake of easy and convenient understanding, the waveform of the driving voltage pulse $V_{LC}$ output by the simulation device of the present Embodiment as shown above is the same as that of Embodiment 1, so as to avoid being too complicated to understand. However, the waveform can be designed to have various variations according to the actual requirements of the LCD display.

As it is known from the detailed description of the above six embodiments of the present invention that, the method and device of the present invention are characterized in that, the scanning black lines as described above can also achieve the similar effects of writing black frames, blinking backlights, or the combination of these two methods of the prior art, so as to simulate the impulse-type CRT display using the LCD display, and apparently it is superior to the prior art for the following reasons:

(1) The present invention can save the extra cost and expense of the additional frequency doubling device or the backlight blinking equipment as required by the prior art;

(2) The present invention can avoid the electric magnetic interference induced by the additional equipment;

(3) The especially important feature of the present invention is that the interval between two input control voltage pulses $G_1$ and $G_{1'}$ within the duration of the same frame can be adjusted depending on the actual requirements, so as to make the duration of the liquid crystal optical gray level response and the black line scanning (especially the black line scanning) adjustable in the duration of the same frame. Therefore, the designer of the LCD display is able to adjust the duration of the black line scanning depending on the time required by the optical response characteristic of different liquid crystal material, and the present invention can not only provide adequate design flexibility, but can also eliminate thoroughly the phenomenon of image superposition and outline blurring created by the "after-image" of the prior art, so as to optimize the quality of the images displayed. Therefore, the present invention can indeed achieve the purpose and the effectiveness of simulating the impulse-type CRT display using the LCD display. The description above indicates all the features of the present invention superior to those of the prior art.

Summing up the above, the method and device utilized by the present invention in simulating the impulse-type CRT display can indeed overcome and improve the drawbacks and limitations of the similar liquid crystal display of the prior art, and it can save the extra cost and expense of the additional equipment and significantly improve its functions. Therefore, the method and device used by the present invention in simulating the impulse-type CRT display is indeed superior to those of the prior art. The present invention does have the value of utilization in the industry, and it does contain novelty and inventive steps, and it is in compliance with the patent requirements.

The description mentioned above only relates to the preferred Embodiments of the present invention, and it is intended to be illustrative rather than restrictive to the contents of the claims and the present invention; and various changes and modifications can be made by the people familiar with this technology without departing from the scope of the present invention and the appended claims.

What is claimed is:

1. A device for simulating an impulse-type CRT display using a liquid crystal display, comprising:

a first input control line connected to a first gate driver;

a first input data line;

a driving voltage output line;

a first transistor having a gate connected to the first input control line, a source connected to the first input data line, and a drain connected to the driving voltage output line;

a second input control line connected to a second gate driver;

a second input data line;

a second transistor having a gate connected to the second input control line, a source connected to the second input data line, and a drain connected to the driving voltage output line;

a storage capacitor having a first end connected to the driving voltage output line and a second end connected to ground;

a liquid crystal equivalent capacitor having a first end connected to the driving voltage output line and a second end connected to ground; and wherein the driving voltage output line is used to output a driving voltage for simulating an impulse-type CRT display using a liquid crystal display.

2. A method for simulating an impulse-type CRT display using a liquid crystal display, comprising the following steps:

(1) providing a circuit having a first input control line, a second input control line, a first input data line, a second input data line, a first transistor, a second transistor, a first capacitor, a second capacitor, and a driving voltage output line;

(2) providing a first control signal with a periodic pulse waveform to the first input control line which is connected to a gate of the first transistor;

(3) providing a second control signal with a periodic pulse waveform to the second input control line which is connected to a gate of the second transistor, the second control signal being identical to the first control signal except for having a phase delay;

(4) providing a first data signal to the first input data line which is connected to a source of the first transistor, and feeding the first data signal to the driving voltage output line when the first transistor is activated by the first control signal;

(5) providing a second data signal to the second input data line which is connected to a source of the second transistor, and feeding the second data signal to the driving voltage output line when the second transistor is activated by the second control signal; and (6) outputting an output driving voltage generated at the driving voltage output line by the above steps for simulating an impulse-type CRT display using a liquid crystal display.

3. The method as claimed in claim 2, wherein $D_1$, $D_{1'}$, $G_1$, and $G_{1'}$ are driving voltage pulses applied to the first input data line, the second input data line, the first input control line and the second input control line respectively, and $V_{LC}$ is the output driving voltage generated at the driving voltage output line sequentially and periodically from time points A1 to A6 for (N−1)th, Nth, (N+1)th, and (N+2)th time frames in the following manner:

(a) before time point A1, the value of $D_{1'}$ in the (N−1)th time frame is $V_{1'}$ which is of negative polarity, and the value of $V_{LC}$ is $V_{1'}$;

(b) at time point A1, the Nth frame starts and the value of $D_1$ increases to $V_2$ which is of positive polarity; and the value of $V_{LC}$ also increases from $V_{1'}$ to $V_2$ due to the activation of $G_1$ and remains so until time point A2;

(c) at time point A2, the value of $D_{1'}$ is $V_1$ which is of positive polarity, and the value of $V_{LC}$ drops from $V_2$ to $V_1$ due to the activation of $G_{1'}$ and is maintained until time point A3;

(d) at time point A3, the (N+1)th time frame starts and the value of $D_1$ drops to $V_{3'}$ which is of negative polarity; and the value of $V_{LC}$ also drops from $V_1$ to $V_{3'}$ due to the activation of $G_1$ and remains so until time point A4;

(e) at time point A4, the value of $D_{1'}$ is still $V_{1'}$, and the value of $V_{LC}$ increases from $V_{3'}$ to $V_{1'}$ due to the activation of $G_{1'}$ and remains so until time point A5; and (f) at time point A5, the (N+2)th time frame starts and the value of $D_1$ increases to $V_3$ which is of positive polarity; and the value of $V_{LC}$ also increases from $V_{1'}$ to $V_3$ due to the activation of $G_1$ and remains so until time point A6.

4. The method as claimed in claim 3, wherein when the output driving voltage $V_{LC}$ between each time point is $V_1$ or $V_{1'}$, a black line scanning is performed on a display screen to optimally simulate the impulse-type CRT display using an LCD display.

5. A device for simulating an impulse-type CRT display using a liquid crystal display, comprising:

a first input control line connected to a first gate driver;

a first input data line;

a driving voltage output line;

a first transistor having a gate connected to the first input control line, a source connected to the first input data line, and a drain connected to the driving voltage output line;

a second input control line connected to a second gate driver;

a second input data line;

a second transistor having a gate connected to the second input control line, a source connected to the second input data line, and a drain connected to the driving voltage output line;

a third input data line;

a fourth input data line;

a fifth input data line;

a third transistor having a gate connected to the third input data line, a drain connected to the first input data line, and a source connected to the fifth input data line;

a fourth transistor having a gate connected to the fourth input data line, a drain connected to the second input data line, and a source connected to the fifth input data line;

a storage capacitor having a first end connected to the driving voltage output line and a second end connected to ground; and a liquid crystal equivalent capacitor having a first end connected to the driving voltage output line and a second end connected to ground;

wherein the driving voltage output line is used to output a driving voltage for simulating an impulse-type CRT display using a liquid crystal display, and the time difference between voltage pulses applied to the first and second input control lines is the time difference across n scanning lines generated by n pulses.

6. A method for simulating an impulse-type CRT display using a liquid crystal display, comprising the following steps:

(1) providing a circuit having a first input control line, a second input control line, a first input data line, a second input data line, a third input data line, a fourth input data line, a fifth input data line, a first transistor, a second transistor, a third transistor, a fourth transistor, a first capacitor, a second capacitor, and a driving voltage output line;

(2) providing a first control signal with a periodic pulse waveform to the first input control line which is connected to a gate of the first transistor;

(3) providing a second control signal with a periodic pulse waveform to the second input control line which is connected to a gate of the second transistor, the second control signal being identical to the first control signal except for having a phase delay;

(4) providing a first data signal generated by a drain of the third transistor to the first input data line which is connected to a source of the first transistor, and feeding the first data signal to the driving voltage output line when the first transistor is activated by the first control signal;

(5) providing a second data signal generated by a drain of the fourth transistor to the second input data line which is connected to a source of the second transistor, and feeding the second data signal to the driving voltage output line when the second transistor is activated by the second control signal;

(6) providing a third data signal to the third input data line which is connected to a gate of the third transistor;

(7) providing a fourth data signal to the fourth input data line which is connected to a gate of the fourth transistor;

(8) providing a fifth data signal to the fifth input data line which is connected to both a source of the third transistor and a source of the fourth transistor; and (9) outputting an output driving voltage generated at the driving voltage output line by the above steps for simulating an impulse-type CRT display using a liquid crystal display.

7. The method as claimed in claim 6, wherein $D_1$, $D_{1'}$, $G_1$, and $G_{1'}$ are driving voltage pulses applied to the first input data line, the second input data line, the first input control line and the second input control line respectively, and $V_{LC}$ is the output driving voltage generated at the driving voltage output line sequentially and periodically from time points A1 to A6 for (N−1)th, Nth, (N+1)th, and (N+2)th time frames in the following manner:

(a) before time point A1, the value of $D_{1'}$ in the (N−1)th time frame is $V_{1'}$ which is of negative polarity, and the value of $V_{LC}$ is $V_{1'}$;

(b) at time point A1, the Nth frame starts and the value of $D_1$ increases to $V_2$ which is of positive polarity; and the value of $V_{LC}$ also increases from $V_{1'}$ to $V_2$ due to the activation of $G_1$ and remains so until time point A2;

(c) at time point A2, the value of $D_{1'}$ is $V_1$ which is of positive polarity, and the value of $V_{LC}$ drops from $V_2$ to $V_1$ due to the activation of $G_{1'}$ and is maintained until time point A3;

(d) at time point A3, the (N+1)th time frame starts and the value of $D_1$ drops to $V_{3'}$ which is of negative polarity; and the value of $V_{LC}$ also drops from $V_1$ to $V_{3'}$ due to the activation of $G_1$ and remains so until time point A4;

(e) at time point A4, the value of $D_{1'}$ is still $V_{1'}$, and the value of $V_{LC}$ increases from $V_{3'}$ to $V_{1'}$ due to the activation of $G_{1'}$ and remains so until time point A5; and (f) at time point A5, the (N+2)th time frame starts and the value of $D_1$ increases to $V_3$ which is of positive polarity; and the value of $V_{LC}$ also increases from $V_{1'}$ to $V_3$ due to the activation of $G_1$ and remains so until time point A6.

8. The method as claimed in claim 7, wherein when the output driving voltage $V_{LC}$ between each time point is $V_1$ or $V_{1'}$, a black line scanning is performed on a display screen to optimally simulate the impulse-type CRT display using an LCD display.

9. A device for simulating an impulse-type CRT display using a liquid crystal display, comprising:

a first input control line connected to a first gate driver;

a first input data line;

a driving voltage output line;

a first transistor having a gate connected to the first input control line, a source connected to the first input data line, and a drain connected to the driving voltage output line;

a second input control line connected to a second gate driver;

a second transistor having a gate connected to the second input control line, a source connected to ground, and a drain connected to the driving voltage output line;

a storage capacitor having a first end connected to the driving voltage output line and a second end connected to ground; and a liquid crystal equivalent capacitor having a first end connected to the driving voltage output line and a second end connected to ground;

wherein the driving voltage output line is used to output a driving voltage for simulating an impulse-type CRT display using a liquid crystal display, and the time difference between voltage pulses applied to the first and second input control lines is the time difference across n scanning lines generated by n pulses.

10. A method for simulating an impulse-type CRT display using a liquid crystal display, comprising the following steps:

(1) providing a circuit having a first input control line, a second input control line, a first input data line, a first transistor, a second transistor, a first capacitor, a second capacitor, and a driving voltage output line;

(2) providing a first control signal with a periodic pulse waveform to the first input control line which is connected to a gate of the first transistor;

(3) providing a second control signal with a periodic pulse waveform to the second input control line which is connected to a gate of the second transistor, the second control signal being identical to the first control signal except for having a phase delay;

(4) providing a first data signal to the first input data line which is connected to a source of the first transistor, and feeding the first data signal to the driving voltage output line when the first transistor is activated by the first control signal;

(5) providing a ground voltage to a source of the second transistor, and feeding the ground voltage to the driving voltage output line when the second transistor is activated by the second control signal; and (6) outputting an output driving voltage generated at the driving voltage output line by the above steps for simulating an impulse-type CRT display using a liquid crystal display.

11. The method as claimed in claim 10, wherein $D_1$, $G_1$, and $G_{1'}$ are driving voltage pulses applied to the first input data line, the first input control line and the second input control line respectively, and $V_{LC}$ is the output driving voltage generated at the driving voltage output line sequentially and periodically from time points A1 to A6 for (N−1)th, Nth, (N+1)th, and (N+2)th time frames in the following manner:

(a) before time point A1, the value of $D_1$ in the (N−1)th time frame is $V_{2'}$, and the value of $V_{LC}$ is $V_{1'}$ which is the ground voltage $V_{com}$ because the source of the second transistor is connected to the ground voltage;

(b) at time point A1, the Nth frame starts and the value of $D_1$ increases to $V_2$ which is of positive polarity; and the value of $V_{LC}$ also increases from $V_{1'}$ to $V_2$ due to the activation of $G_1$ and remains so until time point A2;

(c) at time point A2, the value of $D_1$ is still $V_2$, and the value of $V_{LC}$ drops from $V_2$ to $V_1$ which is equal to $V_{com}$ due to the activation of $G_{1'}$ and is maintained until time point A3;

(d) at time point A3, the (N+1)th time frame starts and the value of $D_1$ drops to $V_{3'}$ which is of negative polarity; and the value of $V_{LC}$ also drops from $V_1$ to $V_{3'}$ due to the activation of $G_1$ and remains so until time point A4;

(e) at time point A4, the value of $D_1$ is still $V_{3'}$, and the value of $V_{LC}$ increases from $V_{3'}$ to $V_{1'}$ which is equal to $V_{com}$ due to the activation of $G_{1'}$ and remains so until time point A5; and (f) at time point A5, the (N+2)th time frame starts and the value of $D_1$ increases to $V_3$ which is of positive polarity; and the value of $V_{LC}$ also increases from $V_{1'}$ to $V_3$ due to the activation of $G_1$ and remains so until time point A6.

12. The method as claimed in claim 11, wherein when the output driving voltage $V_{LC}$ between each time point is $V_1$ or $V_{1'}$, a black line scanning is performed on a display screen to optimally simulate the impulse-type CRT display using an LCD display.

13. A device for simulating an impulse-type CRT display using a liquid crystal display, comprising:

a first input control line connected to a gate driver, the gate driver having an output enable control line and a start pulse horizontal control line;

a second input control line connected to the gate driver;

a first input data line;

a driving voltage output line;

a transistor having a gate connected to the first input control line or the second input control line, a source connected to the first input data line, and a drain connected to the driving voltage output line;

a storage capacitor having a first end connected to the driving voltage output line and a second end connected to ground; and a liquid crystal equivalent capacitor having a first end connected to the driving voltage output line and a second end connected to ground;

wherein the driving voltage output line is used to output a driving voltage for simulating an impulse-type CRT display using a liquid crystal display, and the gate driver generates synchronous control voltage pulses according to control signals at the output enable and start pulse horizontal control lines for the first and second input control lines to control the transistor for generating two synchronous scanning lines separated by a pre-defined scanning line on a display screen.

14. A method for simulating an impulse-type CRT display using a liquid crystal display, comprising the following steps:

(1) providing a circuit having a first input control line, a second input control line, a first input data line, a transistor, a first capacitor, a second capacitor, and a driving voltage output line;

(2) providing an output enable (OE) control signal and a start pulse horizontal (STH) control signal to a gate driver for generating and providing two synchronous control signals to control a gate of the transistor via the first and second input control lines;

(3) providing a first data signal to the first input data line which is connected to a source of the transistor, and feeding the first data signal to the driving voltage output line when the transistor is activated by the two synchronous control signals; and (4) outputting an output driving voltage generated at the driving voltage output line by the above steps for simulating an impulse-type CRT display using a liquid crystal display.

15. The method as claimed in claim 14, wherein $D_1$ and $G_1$ are driving voltage pulses applied to the first input data line and the gate of the transistor respectively, and $V_{LC}$ is the output driving voltage generated at the driving voltage output line sequentially and periodically from time points A1 to A6 for (N−1)th, Nth, (N+1)th, and (N+2)th time frames in the following manner:

(a) before time point A1, the value of $D_1$ in the (N−1)th time frame is $V_{1'}$ which is of negative polarity, and the value of $V_{LC}$ is $V_{1'}$;

(b) at time point A1, the Nth frame starts and the value of $D_1$ increases to $V_2$ which is of positive polarity; and the value of $V_{LC}$ also increases from $V_{1'}$ to $V_2$ due to the activation of $G_1$ and remains so until time point A2;

(c) at time point A2, the value of $D_1$ is $V_1$ which is still of positive polarity, and the value of $V_{LC}$ drops from $V_2$ to $V_1$ due to the activation of $G_1$ and is maintained until time point A3;

(d) at time point A3, the (N+1)th time frame starts and the value of $D_1$ drops to $V_{3'}$ which is of negative polarity; and the value of $V_{LC}$ also drops from $V_1$ to $V_{3'}$ due to the activation of $G_1$ and remains so until time point A4;

(e) at time point A4, the value of $D_1$ is $V_{1'}$, and the value of $V_{LC}$ increases from $V_{3'}$ to $V_{1'}$ due to the activation of $G_1$ and remains so until time point A5; and (f) at time point A5, the (N+2)th time frame starts and the value of $D_1$ increases to $V_3$ which is of positive polarity; and the value of $V_{LC}$ also increases from $V_{1'}$ to $V_3$ due to the activation of $G_1$ and remains so until time point A6.

16. The method as claimed in claim 15, wherein when the output driving voltage $V_{LC}$ between each time point is $V_1$ or $V_{1'}$, a black line scanning is performed on a display screen to optimally simulate the impulse-type CRT display using an LCD display.

17. A device for simulating an impulse-type CRT display using a liquid crystal display, comprising:

a first input control line connected to a gate driver, the gate driver having first, second and third output enable control lines and first, second and third start pulse horizontal control lines for generating three sets of control voltage pulses each having two synchronous control voltage pulses periodically;

a second input control line connected to the gate driver;

a third input control line connected to the gate driver;

a first input data line;

a driving voltage output line;

a transistor having a gate connected to the first input control line, the second input control line or the third input control line, a source connected to the first input data line, and a drain connected to the driving voltage output line;

a storage capacitor having a first end connected to the driving voltage output line and a second end connected to ground; and a liquid crystal equivalent capacitor having a first end connected to the driving voltage output line and a second end connected to ground;

wherein the driving voltage output line is used to output a driving voltage displaying images for simulating an impulse-type CRT display using a liquid crystal display, and the gate driver selects two of the three sets of control voltage pulses according to control signals at the output enable and start pulse horizontal control lines to provide the synchronous control voltage pulses through the first, second and third input control lines for controlling the transistor in a cyclic alternating manner for generating two synchronous scanning lines separated by a pre-defined scanning line on a display screen.

18. A method for simulating an impulse-type CRT display using a liquid crystal display, comprising the following steps:

(1) providing a circuit having first, second and third input control lines, a first input data line, a transistor, a first capacitor, a second capacitor, and a driving voltage output line;

(2) providing first, second and third output enable (OE) control signals and first, second and third start pulse horizontal (STH) control signals to a gate driver for generating three sets of control voltage pulses, each set having two synchronous control voltage pulses periodically;

(3) selecting two of the three sets of control voltage pulses and providing the synchronous control voltage pulses to control a gate of the transistor via the first, second and third input control lines in a cyclic alternating manner;

(4) providing a first data signal to the first input data line which is connected to a source of the transistor, and feeding the first data signal to the driving voltage output line when the transistor is activated by the synchronous control voltage pulses; and (5) outputting an output driving voltage generated at the driving voltage output line by the above steps for simulating an impulse-type CRT display using a liquid crystal display.

19. The method as claimed in claim 18, wherein $D_1$ and $G_1$ are driving voltage pulses applied to the first input data line and the gate of the transistor respectively, and $V_{LC}$ is the output driving voltage generated at the driving voltage output line sequentially and periodically from time points A1 to A6 for (N−1)th, Nth, (N+1)th, and (N+2)th time frames in the following manner:

(a) before time point A1, the value of $D_1$ in the (N−1)th time frame is $V_{1'}$ which is of negative polarity, and the value of $V_{LC}$ is $V_{1'}$;

(b) at time point A1, the Nth frame starts and the value of $D_1$ increases to $V_2$ which is of positive polarity; and the value of $V_{LC}$ also increases from $V_{1'}$ to $V_2$ due to the activation of $G_1$ and remains so until time point A2;

(c) at time point A2, the value of $D_1$ is $V_1$ which is still of positive polarity, and the value of $V_{LC}$ drops from $V_2$ to $V_1$ due to the activation of $G_1$ and is maintained until time point A3;

(d) at time point A3, the (N+1)th time frame starts and the value of $D_1$ drops to $V_{3'}$ which is of negative polarity; and the value of $V_{LC}$ also drops from $V_1$ to $V_{3'}$, due to the activation of $G_1$ and remains so until time point A4;

(e) at time point A4, the value of $D_1$ is $V_{1'}$, and the value of $V_{LC}$ increases from $V_{3'}$ to $V_{1'}$ due to the activation of $G_1$ and remains so until time point A5; and (f) at time point A5, the (N+2)th time frame starts and the value of $D_1$ increases to $V_3$ which is of positive polarity; and the value of $V_{LC}$ also increases from $V_{1'}$ to $V_3$ due to the activation of $G_1$ and remains so until time point A6.

20. The method as claimed in claim 19, wherein when the output driving voltage $V_{LC}$ between each time point is $V_1$ or $V_{1'}$, a black line scanning is performed on a display screen to optimally simulate the impulse-type CRT display using an LCD display.

21. A device for simulating an impulse-type CRT display using a liquid crystal display, comprising:

a first input control line connected to a gate driver, the gate driver having first, second and third output enable control lines and first, second and third start pulse horizontal control lines for generating three sets of control voltage pulses;

a second input control line connected to the gate driver;

a third input control line connected to the gate driver;

a first input data line;

a driving voltage output line;

a transistor having a gate connected to the first input control line, the second input control line or the third input control line, a source connected to the first input data line, and a drain connected to the driving voltage output line;

a storage capacitor having a first end connected to the driving voltage output line and a second end connected to ground; and a liquid crystal equivalent capacitor having a first end connected to the driving voltage output line and a second end connected to ground;

wherein the driving voltage output line is used to output a driving voltage for simulating an impulse-type CRT display using a liquid crystal display, and the gate driver provides the three sets of control voltage pulses through the first, second and third input control lines according to control signals at the output enable and start pulse horizontal control lines for controlling the transistor and generating three synchronous scanning lines separated by a pre-defined scanning line on a display screen.

22. A method for simulating an impulse-type CRT display using a liquid crystal display, comprising the following steps:

(1) providing a circuit having first, second and third input control lines, a first input data line, a transistor, a first capacitor, a second capacitor, and a driving voltage output line;

(2) providing output enable (OE) control signals and start pulse horizontal (STH) control signals to a gate driver for generating three sets of control voltage pulses;

(3) providing the control voltage pulses to control a gate of the transistor via the first, second and third input control lines;

(4) providing a first data signal to the first input data line which is connected to a source of the transistor, and feeding the first data signal to the driving voltage output line when the transistor is activated by the control voltage pulses; and (5) outputting an output driving voltage generated at the driving voltage output line by the above steps for simulating an impulse-type CRT display using a liquid crystal display for generating three synchronous scanning lines separated by a pre-defined scanning line on a display screen for displaying images.

23. The method as claimed in claim 22, wherein $D_1$ and $G_1$ are driving voltage pulses applied to the first input data line and the gate of the transistor respectively, and $V_{LC}$ is the output driving voltage generated at the driving voltage output line sequentially and periodically from time points A1 to A6 for (N−1)th, Nth, (N+1)th, and (N+2)th time frames in the following manner:

(a) before time point A1, the value of $D_1$ in the (N−1)th time frame is $V_{1'}$ which is of negative polarity, and the value of $V_{LC}$ is $V_{1'}$;

(b) at time point A1, the Nth frame starts and the value of $D_1$ increases to $V_2$ which is of positive polarity; and the value of $V_{LC}$ also increases from $V_{1'}$ to $V_2$ due to the activation of $G_1$ and remains so until time point A2;

(c) at time point A2, the value of $D_1$ is $V_1$ which is still of positive polarity, and the value of $V_{LC}$ drops from $V_2$ to $V_1$ due to the activation of $G_1$ and is maintained until time point A3;

(d) at time point A3, the (N+1)th time frame starts and the value of $D_1$ drops to $V_{3'}$ which is of negative polarity; and the value of $V_{LC}$ also drops from $V_1$ to $V_{3'}$, due to the activation of $G_1$ and remains so until time point A4;

(e) at time point A4, the value of $D_1$ is $V_{1'}$, and the value of $V_{LC}$ increases from $V_{3'}$ to $V_{1'}$ due to the activation of $G_1$ and remains so until time point A5; and (f) at time point A5, the (N+2)th time frame starts and the value of $D_1$ increases to $V_3$ which is of positive polarity; and the value of $V_{LC}$ also increases from $V_{1'}$ to $V_3$ due to the activation of $G_1$ and remains so until time point A6.

24. The method as claimed in claim 23, wherein when the output driving voltage $V_{LC}$ between each time point is $V_1$ or $V_{1'}$, a black line scanning is performed on a display screen to optimally simulate the impulse-type CRT display using an LCD display.

* * * * *